United States Patent
Narayan et al.

(10) Patent No.: US 10,581,954 B2
(45) Date of Patent: *Mar. 3, 2020

(54) METRIC COLLECTION AND AGGREGATION FOR DISTRIBUTED SOFTWARE SERVICES

(71) Applicant: Palantir Technologies Inc., Palo Alto, CA (US)

(72) Inventors: Tushar Narayan, San Mateo, CA (US); Andrew Colombi, San Francisco, CA (US); Robert Fink, San Francisco, CA (US); Alexander Ince-Cushman, San Francisco, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/625,548

(22) Filed: Jun. 16, 2017

(65) Prior Publication Data

US 2018/0288135 A1 Oct. 4, 2018

Related U.S. Application Data

(60) Provisional application No. 62/478,379, filed on Mar. 29, 2017.

(51) Int. Cl.
*G06F 11/34* (2006.01)
*H04L 29/08* (2006.01)
(Continued)

(52) U.S. Cl.
CPC .......... *H04L 67/10* (2013.01); *G06F 11/3466* (2013.01); *G06F 16/9566* (2019.01);
(Continued)

(58) Field of Classification Search
CPC ............. G06F 11/3404; G06F 11/3604; G06F 11/3466; G06F 11/34; G06F 11/3668;
(Continued)

(56) References Cited

U.S. PATENT DOCUMENTS 5,515,488 A 5/1996 Hoppe et al.
6,430,305 B1 8/2002 Decker
(Continued)

FOREIGN PATENT DOCUMENTS

CN 102546446 A 7/2012
CN 103167093 A 6/2013
(Continued)

OTHER PUBLICATIONS

"5 Great Tools for Visualizing your Twitter Followers", Amnet Blog, http://www.amnetblog.com/component/content/article/115-5-great-tools-for-visualizing-your-twitter-followers.html, (Aug. 4, 2010), 1-5.
(Continued)

*Primary Examiner* — Tom Y Chang
(74) *Attorney, Agent, or Firm* — Schwegman Lundberg & Woessner, P.A.

(57) ABSTRACT

Various embodiments disclosed herein relate to collection and aggregation of metrics for software services operating across a plurality of computing nodes.

18 Claims, 7 Drawing Sheets

(51) Int. Cl.
  *G06F 16/955* (2019.01)
  *H04L 12/26* (2006.01)
  *G06F 11/30* (2006.01)
  *G06F 11/36* (2006.01)

(52) U.S. Cl.
  CPC .......... *G06F 11/30* (2013.01); *G06F 11/3082* (2013.01); *G06F 11/3409* (2013.01); *G06F 11/3476* (2013.01); *G06F 11/3495* (2013.01); *G06F 11/3636* (2013.01); *H04L 43/08* (2013.01)

(58) Field of Classification Search
  CPC ............... G06F 11/008; G06F 11/3476; G06F 11/3495; G06F 11/3409; G06F 11/3636; G06F 11/30; G06F 11/3082; H04L 43/04; H04L 43/06; H04L 43/08
  See application file for complete search history.

(56) References Cited

U.S. PATENT DOCUMENTS

| | | |
|---|---|---|
| 6,820,135 B1 | 11/2004 | Dingman et al. |
| 6,978,419 B1 | 12/2005 | Kantrowitz |
| 6,980,984 B1 | 12/2005 | Huffman et al. |
| 7,168,039 B2 | 1/2007 | Bertram |
| 7,461,077 B1 | 12/2008 | Greenwood et al. |
| 7,617,232 B2 | 11/2009 | Gabbert et al. |
| 7,756,843 B1 | 7/2010 | Palmer |
| 7,899,796 B1 | 3/2011 | Borthwick et al. |
| 7,917,376 B2 | 3/2011 | Bellin et al. |
| 7,941,321 B2 | 5/2011 | Greenstein et al. |
| 8,036,971 B2 | 10/2011 | Aymeloglu et al. |
| 8,037,046 B2 | 10/2011 | Udezue et al. |
| 8,046,283 B2 | 10/2011 | Burns et al. |
| 8,054,756 B2 | 11/2011 | Chand et al. |
| 8,214,490 B1 | 7/2012 | Vos et al. |
| 8,229,902 B2 | 7/2012 | Vishniac et al. |
| 8,290,838 B1 | 10/2012 | Thakur et al. |
| 8,302,855 B2 | 11/2012 | Ma et al. |
| 8,386,377 B1 | 2/2013 | Xiong et al. |
| 8,473,454 B2 | 6/2013 | Evanitsky et al. |
| 8,484,115 B2 | 7/2013 | Aymeloglu et al. |
| 8,489,641 B1 | 7/2013 | Seefeld et al. |
| 8,577,911 B1 | 11/2013 | Stepinski et al. |
| 8,589,273 B2 | 11/2013 | Creeden et al. |
| 8,688,573 B1 | 4/2014 | Rukonic et al. |
| 8,744,890 B1 | 6/2014 | Bernier et al. |
| 8,799,799 B1 | 8/2014 | Cervelli et al. |
| 8,806,355 B2 | 8/2014 | Twiss et al. |
| 8,812,960 B1 | 8/2014 | Sun et al. |
| 8,924,388 B2 | 12/2014 | Elliot et al. |
| 8,924,389 B2 | 12/2014 | Elliot et al. |
| 8,938,686 B1 | 1/2015 | Erenrich et al. |
| 8,949,164 B1 | 2/2015 | Mohler |
| 9,069,842 B2 | 6/2015 | Melby |
| 9,100,428 B1 | 8/2015 | Visbal |
| 9,111,281 B2 | 8/2015 | Stibel et al. |
| 9,129,219 B1 | 9/2015 | Robertson et al. |
| 9,256,664 B2 | 2/2016 | Chakerian et al. |
| 9,280,618 B1 | 3/2016 | Bruce et al. |
| 9,286,373 B2 | 3/2016 | Elliot et al. |
| 9,335,911 B1 | 5/2016 | Elliot et al. |
| 2002/0065708 A1 | 5/2002 | Senay et al. |
| 2002/0095360 A1 | 7/2002 | Joao |
| 2002/0095658 A1 | 7/2002 | Shulman et al. |
| 2002/0103705 A1 | 8/2002 | Brady |
| 2002/0147805 A1 | 10/2002 | Leshem et al. |
| 2003/0126102 A1 | 7/2003 | Borthwick |
| 2004/0034570 A1 | 2/2004 | Davis |
| 2004/0111480 A1 | 6/2004 | Yue |
| 2004/0153418 A1 | 8/2004 | Hanweck |
| 2004/0236688 A1 | 11/2004 | Bozeman |
| 2005/0010472 A1 | 1/2005 | Quatse et al. |
| 2005/0086207 A1 | 4/2005 | Heuer et al. |
| 2005/0154628 A1 | 7/2005 | Eckart et al. |
| 2005/0154769 A1 | 7/2005 | Eckart et al. |
| 2006/0026120 A1 | 2/2006 | Carolan et al. |
| 2006/0026170 A1 | 2/2006 | Kreitler et al. |
| 2006/0080283 A1 | 4/2006 | Shipman |
| 2006/0143034 A1 | 6/2006 | Rothermel et al. |
| 2006/0143075 A1 | 6/2006 | Carr et al. |
| 2006/0143079 A1 | 6/2006 | Basak et al. |
| 2007/0000999 A1 | 1/2007 | Kubo et al. |
| 2007/0011304 A1 | 1/2007 | Error |
| 2007/0038646 A1 | 2/2007 | Thota |
| 2007/0150801 A1 | 6/2007 | Chidlovskii et al. |
| 2007/0156673 A1 | 7/2007 | Maga et al. |
| 2007/0162454 A1 | 7/2007 | D', Albora et al. |
| 2007/0185867 A1 | 8/2007 | Maga et al. |
| 2007/0192122 A1 | 8/2007 | Routson et al. |
| 2007/0284433 A1 | 12/2007 | Domenica et al. |
| 2008/0065655 A1 | 3/2008 | Chakravarthy et al. |
| 2008/0069081 A1 | 3/2008 | Chand et al. |
| 2008/0077642 A1 | 3/2008 | Carbone |
| 2008/0103996 A1 | 5/2008 | Forman et al. |
| 2008/0208735 A1 | 8/2008 | Balet et al. |
| 2008/0222295 A1 | 9/2008 | Robinson et al. |
| 2008/0243711 A1 | 10/2008 | Aymeloglu et al. |
| 2008/0255973 A1 | 10/2008 | El Wade et al. |
| 2008/0270328 A1 | 10/2008 | Lafferty et al. |
| 2008/0294663 A1 | 11/2008 | Heinley et al. |
| 2008/0313132 A1 | 12/2008 | Hao et al. |
| 2009/0076845 A1 | 3/2009 | Bellin et al. |
| 2009/0094166 A1 | 4/2009 | Aymeloglu et al. |
| 2009/0094270 A1 | 4/2009 | Alirez et al. |
| 2009/0106178 A1 | 4/2009 | Chu |
| 2009/0112745 A1 | 4/2009 | Stefanescu |
| 2009/0125359 A1 | 5/2009 | Knapic et al. |
| 2009/0125459 A1 | 5/2009 | Norton et al. |
| 2009/0132953 A1 | 5/2009 | Reed, Jr. et al. |
| 2009/0144812 A1* | 6/2009 | Sasamura ............... G06F 21/35 726/5 |
| 2009/0157732 A1 | 6/2009 | Hao et al. |
| 2009/0187546 A1 | 7/2009 | Hamilton Whyte |
| 2009/0187548 A1 | 7/2009 | Ji et al. |
| 2009/0249244 A1 | 10/2009 | Robinson et al. |
| 2009/0254842 A1 | 10/2009 | Leacock et al. |
| 2009/0259636 A1 | 10/2009 | Labrou et al. |
| 2009/0271343 A1 | 10/2009 | Vaiciulis et al. |
| 2009/0307049 A1 | 12/2009 | Elloitt, Jr. et al. |
| 2009/0313463 A1 | 12/2009 | Pang et al. |
| 2009/0319418 A1 | 12/2009 | Herz |
| 2009/0319515 A1 | 12/2009 | Minton et al. |
| 2009/0319891 A1 | 12/2009 | MacKinlay et al. |
| 2010/0030722 A1 | 2/2010 | Goodson et al. |
| 2010/0031141 A1 | 2/2010 | Summers et al. |
| 2010/0042922 A1 | 2/2010 | Bradateanu et al. |
| 2010/0057622 A1 | 3/2010 | Faith |
| 2010/0070842 A1 | 3/2010 | Aymeloglu et al. |
| 2010/0098318 A1 | 4/2010 | Anderson |
| 2010/0106752 A1 | 4/2010 | Eckardt, III et al. |
| 2010/0114887 A1 | 5/2010 | Conway et al. |
| 2010/0131502 A1 | 5/2010 | Fordham |
| 2010/0161735 A1 | 6/2010 | Sharma |
| 2010/0191563 A1 | 7/2010 | Schlaifer et al. |
| 2010/0211535 A1 | 8/2010 | Rosenberger |
| 2010/0235915 A1 | 9/2010 | Memon et al. |
| 2010/0262688 A1 | 10/2010 | Hussain et al. |
| 2010/0293174 A1 | 11/2010 | Bennett |
| 2010/0312837 A1 | 12/2010 | Bodapati et al. |
| 2011/0040776 A1 | 2/2011 | Najm et al. |
| 2011/0061013 A1 | 3/2011 | Bilicki et al. |
| 2011/0078173 A1 | 3/2011 | Seligmann et al. |
| 2011/0093327 A1 | 4/2011 | Fordyce, III et al. |
| 2011/0099133 A1 | 4/2011 | Chang et al. |
| 2011/0153384 A1 | 6/2011 | Horne et al. |
| 2011/0173093 A1 | 7/2011 | Psota et al. |
| 2011/0208565 A1 | 8/2011 | Ross et al. |
| 2011/0208724 A1 | 8/2011 | Jones et al. |
| 2011/0213655 A1 | 9/2011 | Henkin et al. |
| 2011/0218955 A1 | 9/2011 | Tang et al. |
| 2011/0269397 A1 | 11/2011 | Eastmond Mauricio et al. |
| 2011/0270604 A1 | 11/2011 | Qi et al. |

(56) References Cited

U.S. PATENT DOCUMENTS

| | | |
|---|---|---|
| 2011/0270834 A1 | 11/2011 | Sokolan et al. |
| 2011/0295649 A1 | 12/2011 | Fine et al. |
| 2011/0314007 A1 | 12/2011 | Dassa et al. |
| 2011/0314024 A1 | 12/2011 | Chang et al. |
| 2012/0004904 A1 | 1/2012 | Shin et al. |
| 2012/0011238 A1 | 1/2012 | Rathod |
| 2012/0011245 A1 | 1/2012 | Gillette et al. |
| 2012/0022945 A1 | 1/2012 | Falkenborg et al. |
| 2012/0054284 A1 | 3/2012 | Rakshit |
| 2012/0059853 A1 | 3/2012 | Jagota |
| 2012/0066166 A1 | 3/2012 | Curbera et al. |
| 2012/0079363 A1 | 3/2012 | Folting et al. |
| 2012/0084117 A1 | 4/2012 | Tavares et al. |
| 2012/0084287 A1 | 4/2012 | Lakshminarayan et al. |
| 2012/0089606 A1 | 4/2012 | Eshwar et al. |
| 2012/0131512 A1 | 5/2012 | Takeuchi et al. |
| 2012/0144335 A1 | 6/2012 | Abeln et al. |
| 2012/0158527 A1 | 6/2012 | Cannelongo |
| 2012/0159362 A1 | 6/2012 | Brown et al. |
| 2012/0173381 A1 | 7/2012 | Smith |
| 2012/0215784 A1 | 8/2012 | King et al. |
| 2012/0221553 A1 | 8/2012 | Wittmer et al. |
| 2012/0226523 A1 | 9/2012 | Weiss et al. |
| 2012/0245976 A1 | 9/2012 | Kumar et al. |
| 2012/0323888 A1 | 12/2012 | Osann, Jr. |
| 2013/0016106 A1 | 1/2013 | Yip et al. |
| 2013/0054306 A1 | 2/2013 | Bhalla et al. |
| 2013/0055145 A1 | 2/2013 | Antony et al. |
| 2013/0057551 A1 | 3/2013 | Ebert et al. |
| 2013/0096988 A1 | 4/2013 | Grossman et al. |
| 2013/0110746 A1 | 5/2013 | Ahn |
| 2013/0151453 A1 | 6/2013 | Bhanot et al. |
| 2013/0166348 A1 | 6/2013 | Scotto |
| 2013/0166480 A1 | 6/2013 | Popescu et al. |
| 2013/0185245 A1 | 7/2013 | Anderson et al. |
| 2013/0185307 A1 | 7/2013 | El-Yaniv et al. |
| 2013/0218879 A1 | 8/2013 | Park et al. |
| 2013/0226318 A1 | 8/2013 | Procyk et al. |
| 2013/0238616 A1 | 9/2013 | Rose et al. |
| 2013/0246170 A1 | 9/2013 | Gross et al. |
| 2013/0246537 A1 | 9/2013 | Gaddala |
| 2013/0246597 A1 | 9/2013 | Iizawa et al. |
| 2013/0263019 A1 | 10/2013 | Castellanos et al. |
| 2013/0268520 A1 | 10/2013 | Fisher et al. |
| 2013/0282696 A1 | 10/2013 | John et al. |
| 2013/0290825 A1 | 10/2013 | Arndt et al. |
| 2013/0297619 A1 | 11/2013 | Chandrasekaran et al. |
| 2013/0304770 A1 | 11/2013 | Boero et al. |
| 2013/0318604 A1 | 11/2013 | Coates et al. |
| 2014/0012796 A1 | 1/2014 | Petersen et al. |
| 2014/0040371 A1 | 2/2014 | Gurevich et al. |
| 2014/0053091 A1 | 2/2014 | Hou et al. |
| 2014/0058914 A1 | 2/2014 | Song et al. |
| 2014/0068487 A1 | 3/2014 | Steiger et al. |
| 2014/0095509 A1 | 4/2014 | Patton |
| 2014/0108380 A1 | 4/2014 | Gotz et al. |
| 2014/0108985 A1 | 4/2014 | Scott et al. |
| 2014/0123279 A1 | 5/2014 | Bishop et al. |
| 2014/0129698 A1* | 5/2014 | Seago .................... G06F 9/542 709/224 |
| 2014/0136285 A1 | 5/2014 | Carvalho |
| 2014/0143009 A1 | 5/2014 | Brice et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0189536 A1 | 7/2014 | Lange et al. |
| 2014/0189870 A1 | 7/2014 | Singla et al. |
| 2014/0195515 A1 | 7/2014 | Baker et al. |
| 2014/0222521 A1 | 8/2014 | Chait |
| 2014/0222793 A1 | 8/2014 | Sadkin et al. |
| 2014/0229554 A1 | 8/2014 | Grunin et al. |
| 2014/0280056 A1 | 9/2014 | Kelly |
| 2014/0282160 A1 | 9/2014 | Zarpas |
| 2014/0344230 A1 | 11/2014 | Krause et al. |
| 2014/0358829 A1 | 12/2014 | Hurwitz |
| 2014/0366132 A1 | 12/2014 | Stiansen et al. |
| 2015/0073929 A1 | 3/2015 | Psota et al. |
| 2015/0073954 A1 | 3/2015 | Braff |
| 2015/0095773 A1 | 4/2015 | Gonsalves et al. |
| 2015/0100897 A1 | 4/2015 | Sun et al. |
| 2015/0106170 A1 | 4/2015 | Bonica |
| 2015/0106379 A1 | 4/2015 | Elliot et al. |
| 2015/0134599 A1 | 5/2015 | Banerjee et al. |
| 2015/0135256 A1 | 5/2015 | Hoy et al. |
| 2015/0188872 A1 | 7/2015 | White |
| 2015/0242401 A1 | 8/2015 | Liu |
| 2015/0338233 A1 | 11/2015 | Cervelli et al. |
| 2015/0358391 A1* | 12/2015 | Moon .................... H04L 67/10 709/224 |
| 2015/0379413 A1 | 12/2015 | Robertson et al. |
| 2016/0004764 A1 | 1/2016 | Chakerian et al. |
| 2016/0180557 A1 | 6/2016 | Yousaf et al. |

FOREIGN PATENT DOCUMENTS

| | | |
|---|---|---|
| CN | 102054015 B | 5/2014 |
| DE | 102014204827 A1 | 9/2014 |
| DE | 102014204830 A1 | 9/2014 |
| DE | 102014204834 A1 | 9/2014 |
| EP | 2487610 A2 | 8/2012 |
| EP | 2858018 A1 | 4/2015 |
| EP | 2869211 A2 | 5/2015 |
| EP | 2889814 A1 | 7/2015 |
| EP | 2892197 A1 | 7/2015 |
| EP | 2963595 A1 | 1/2016 |
| EP | 2996053 A1 | 3/2016 |
| EP | 3035214 | 6/2016 |
| EP | 3038002 A1 | 6/2016 |
| EP | 3040885 A1 | 7/2016 |
| WO | WO-2005116851 A2 | 12/2005 |
| WO | WO-2012061162 | 5/2012 |

OTHER PUBLICATIONS

"About OWA", Open Web Analytics, [Online]. Retrieved from the Internet: <URL: http://www.openwebanalytics.com/?page_jd=2>, (Accessed: Jul. 19, 2013), 5 pgs.

"An Introduction to KeyLines and Network Visualization", Keylines.com, [Online]. Retrieved from the Internet: <URL: http://keylines.com/wp-content/uploads/2014/03/KeyLines-White-Paper.pdf>, (Mar. 2014), 8 pgs.

"Analytics for Data Driven Startups", Trak.io, [Online]. Retrieved from the Internet: <URL: http://trak.io/>, (Accessed: Jul. 18, 2013), 3 pgs.

"Appacts: Open Source Mobile Analytics Platform", http://www.appacts.com, (Jul. 18, 2013), 1-4.

"U.S. Appl. No. 13/827,491, Final Office Action dated Jun. 22, 2015", 28 pgs.

"U.S. Appl. No. 13/827,491, Non Final Office Action dated Oct. 9, 2015", 16 pgs.

"U.S. Appl. No. 13/827,491, Non Final Office Action dated Dec. 1, 2014", 5 pgs.

"U.S. Appl. No. 14/141,252, Final Office Action dated Apr. 14, 2016", 28 pgs.

"U.S. Appl. No. 14/141,252, Non Final Office Action dated Oct. 8, 2015", 11 pgs.

"U.S. Appl. No. 14/225,006, Advisory Action dated Dec. 21, 2015", 4 pgs.

"U.S. Appl. No. 14/225,006, Final Office Action dated Sep. 2, 2015", 28 pgs.

"U.S. Appl. No. 14/225,006, First Action Interview Pre-Interview Communication dated Feb. 27, 2015", 5 pgs.

"U.S. Appl. No. 14/225,006, First Action Interview Pre-Interview Communication dated Sep. 10, 2014", 4 pgs.

"U.S. Appl. No. 14/225,084, Examiner Interview Summary dated Jan. 4, 2016", 3 pgs.

"U.S. Appl. No. 14/225,084, Final Office Action dated Feb. 26, 2016", 14 pgs.

"U.S. Appl. No. 14/225,084, First Action Interview Pre-Interview Communication dated Feb. 20, 2015", 5 pgs.

(56) References Cited

OTHER PUBLICATIONS

"U.S. Appl. No. 14/225,084, First Action Interview Pre-Interview Communication dated Sep. 2, 2014", 17 pgs.
"U.S. Appl. No. 14/225,084, Non Final Office Action dated Sep. 11, 2015", 13 pgs.
"U.S. Appl. No. 14/225,084, Notice of Allowance dated May 4, 2015", 26 pgs.
"U.S. Appl. No. 14/225,160, Advisory Action dated May 20, 2015", 7 pgs.
"U.S. Appl. No. 14/225,160, Examiner Interview Summary dated Apr. 22, 2016", 7 pgs.
"U.S. Appl. No. 14/225,160, Final Office Action dated Jan. 25, 2016", 25 pgs.
"U.S. Appl. No. 14/225,160, Final Office Action dated Feb. 11, 2015", 30 pgs.
"U.S. Appl. No. 14/225,160, First Action Interview Pre-Interview Communication dated Jul. 29, 2014", 19 pgs.
"U.S. Appl. No. 14/225,160, First Action Interview Pre-Interview Communication dated Oct. 22, 2014", 6 pgs.
"U.S. Appl. No. 14/225,160, Non Final Office Action dated Jun. 16, 2016", 14 pgs.
"U.S. Appl. No. 14/225,160, Non Final Office Action dated Aug. 12, 2015", 23 pgs.
"U.S. Appl. No. 14/306,138, Examiner Interview Summary dated Dec. 3, 2015", 3 pgs.
"U.S. Appl. No. 14/306,138, Examiner Interview Summary dated Dec. 24, 2015", 5 pgs.
"U.S. Appl. No. 14/306,147, Final Office Action dated Dec. 24, 2015", 22 pgs.
"U.S. Appl. No. 14/319,161, Final Office Action dated Jan. 23, 2015", 21 pgs.
"U.S. Appl. No. 14/319,161, Notice of Allowance dated May 4, 2015", 6 pgs.
"U.S. Appl. No. 14/319,765, Non Final Office Action dated Feb. 1, 2016", 19 pgs.
"U.S. Appl. No. 14/323,935, Notice of Allowance dated Oct. 1, 2015", 8 pgs.
"U.S. Appl. No. 14/451,221, Non Final Office Action dated Oct. 21, 2014", 16 pgs.
"U.S. Appl. No. 14/463,615, Advisory Action dated Sep. 10, 2015", 3 pgs.
"U.S. Appl. No. 14/463,615, Final Office Action dated May 21, 2015", 31 pgs.
"U.S. Appl. No. 14/463,615, First Action Interview Pre-Interview Communication dated Jan. 28, 2015", 29 pgs.
"U.S. Appl. No. 14/463,615, First Action Interview Pre-Interview Communication dated Nov. 13, 2014", 4 pgs.
"U.S. Appl. No. 14/463,615, Non Final Office Action dated Dec. 9, 2015", 44 pgs.
"U.S. Appl. No. 14/479,863, First Action Interview Pre-Interview Communication dated Dec. 26, 2014", 5 pgs.
"U.S. Appl. No. 14/479,863, Notice of Allowance dated Mar. 31, 2015", 23 pgs.
"U.S. Appl. No. 14/483,527, Final Office Action dated Jun. 22, 2015", 17 pgs.
"U.S. Appl. No. 14/483,527, First Action Interview Pre-Interview Communication dated Jan. 28, 2015", 6 pgs.
"U.S. Appl. No. 14/483,527, Non Final Office Action dated Oct. 28, 2015", 20 pgs.
"U.S. Appl. No. 14/483,527, Notice of Allowance dated Apr. 29, 2016", 34 pgs.
"U.S. Appl. No. 14/552,336, First Action Interview Pre-Interview Communication dated Jul. 20, 2015", 18 pgs.
"U.S. Appl. No. 14/552,336, Notice of Allowance dated Nov. 3, 2015", 13 pgs.
"U.S. Appl. No. 14/562,524, First Action Interview Pre-Interview Communication dated Sep. 14, 2015", 12 pgs.
"U.S. Appl. No. 14/562,524, First Action Interview Pre-Interview Communication dated Nov. 10, 2015", 6 pgs.

"U.S. Appl. No. 14/571,098, Final Office Action dated Feb. 23, 2016", 37 pgs.
"U.S. Appl. No. 14/571,098, First Action Interview dated Aug. 24, 2015", 4 pgs.
"U.S. Appl. No. 14/571,098, First Action Interview Pre-Interview Communication dated Mar. 11, 2015", 4 pgs.
"U.S. Appl. No. 14/571,098, First Action Interview Pre-Interview Communication dated Aug. 5, 2015", 4 pgs.
"U.S. Appl. No. 14/571,098, First Action Interview Pre-Interview Communication dated Nov. 10, 2015", 5 pgs.
"U.S. Appl. No. 14/631,633, First Action Interview Pre-Interview Communication dated Sep. 10, 2015", 5 pgs.
"U.S. Appl. No. 14/676,621, Examiner Interview Summary dated Jul. 30, 2015", 5 pgs.
"U.S. Appl. No. 14/676,621, Final Office Action dated Oct. 29, 2015", 10 pgs.
"U.S. Appl. No. 14/746,671, First Action Interview Pre-Interview Communication dated Nov. 12, 2015", 19 pgs.
"U.S. Appl. No. 14/746,671, Notice of Allowance dated Jan. 21, 2016", 7 pgs.
"U.S. Appl. No. 14/800,447, First Action Interview—Pre-Interview Communication dated Dec. 10, 2015", 6 pgs.
"U.S. Appl. No. 14/813,749, Final Office Action dated Apr. 8, 2016", 80 pgs.
"U.S. Appl. No. 14/813,749, Non Final Office Action dated Sep. 28, 2015", 22 pgs.
"U.S. Appl. No. 14/842,734, First Action Interview Pre-Interview Communication dated Nov. 19, 2015", 17 pgs.
"U.S. Appl. No. 14/858,647, Notice of Allowance dated Mar. 4, 2016", 47 pgs.
"U.S. Appl. No. 14/929,584, Final Office Action dated May 25, 2016", 42 pgs.
"U.S. Appl. No. 14/929,584, Non Final Office Action dated Feb. 4, 2016", 15 pgs.
"Apsalar—Mobile App Analytics & Advertising", https://apsalar.com/, (Jul. 18, 2013), 1-8.
"Beta Testing on the Fly", TestFlight, [Online]. Retrieved from the Internet: <URL: https://testflightapp. com/>, (Accessed: Jul. 18, 2013), 3 pgs.
"Countly", Countly Mobile Analytics, [Online]. Retrieved from the Internet: <URL:http://count.ly/products/screenshots, (accessed Jul. 18, 2013), 9 pgs.
"DISTIMO—App Analytics", [Online]. Retrieved from the Internet: <URL:http://www.distimo.com/app-analytics, (accessed Jul. 18, 2013), 5 pgs.
"European Application Serial No. 14187996.5, Communication Pursuant to Article 94(3) EPC dated Feb. 19, 2016", 9 pgs.
"European Application Serial No. 14187996.5, Extended European Search Report dated Feb. 12, 2015", 7 pgs.
"European Application Serial No. 14191540.5, Extended European Search Report dated May 27, 2015", 9 pgs.
"European Application Serial No. 14200246.8, Extended European Search Report dated May 29, 2015", 8 pgs.
"European Application Serial No. 14200298.9, Extended European Search Report dated May 13, 2015", 7 pgs.
"European Application Serial No. 15181419.1, Extended European Search Report dated Sep. 29, 2015", 7 pgs.
"European Application Serial No. 15184764.7, Extended European Search Report dated Dec. 14, 2015", 8 pgs.
"European Application Serial No. 15200073.3, Extended European Search Report dated May 30, 2016", 16 pgs.
"European Application Serial No. 15201924.6, Extended European Search Report dated Apr. 25, 2016", 8 pgs.
"European Application Serial No. 1520919.5, Extended European Search Report dated May 9, 2016", 13 pgs.
"European Application Serial No. 16152984.7, Extended European Search Report dated Mar. 24, 2016", 8 pgs.
"Flurry Analytics", [Online]. Retrieved from the Internet: <URL: http://www.flurry.com/, (accessed Jul. 18, 2013), 14 pgs.
"Google Analytics Official Website—Web Analytics & Reporting", [Online]. Retrieved from the Internet: <URL: http ://www.google.com/ analytics/index.html, (accessed Jul. 18, 2013), 22 pgs.

(56) References Cited

OTHER PUBLICATIONS

"Great Britain Application Serial No. 1404486.1, Combined Search Report and Examination Report dated Aug. 27, 2014", 5 pgs.
"Great Britain Application Serial No. 1404486.1, Office Action dated May 21, 2015", 2 pgs.
"Great Britain Application Serial No. 1404489.5, Combined Search Report and Examination Report dated Aug. 27, 2014", 5 pgs.
"Great Britain Application Serial No. 1404489.5, Office Action dated May 21, 2015", 3 pgs.
"Great Britain Application Serial No. 1404489.5, Office Action dated Oct. 6, 2014", 1 pgs.
"Great Britain Application Serial No. 1404499.4, Combined Search Report and Examination Report dated Aug. 20, 2014", 6 pgs.
"Great Britain Application Serial No. 1404499.4, Office Action dated Jun. 11, 2015", 5 pgs.
"Great Britain Application Serial No. 1404499.4, Office Action dated Sep. 29, 2014", 1 pg.
"Help File for ModelRisk Version 5—Part 1", Vose Software, (2007), 375 pgs.
"Help File for ModelRisk Version 5—Part 2", Vose Software, (2007), 362 pgs.
"Hunchlab: Heat Map and Kernel Density Calculation for Crime Analysis", Azavea Journal, [Online]. Retrieved from the Internet: <www.azavea.com/blogs/newsletter/v4i4/kernel-density-capabilities-added-to-hunchlab>, (Sep. 9, 2014), 2 pgs.
"KeyLines Datasheet", Keylines.com, [Online]. Retrieved from the Internet: <URL:http://keylines.com/wp-content/uploads/2014/03/KeyLines-datasheet.pdf>, (Mar. 2014), 2 pgs.
"Mixpanel: Actions speak louder than page views", Mobile Analytics, [Online]. Retrieved from the Internet: <URL: https://mixpanel.com/>, (Accessed: Jul. 18, 2013), 13 pgs.
"Mobile App Marketing & Analytics", Localytics, [Online]. Retrieved from the Internet: <URL: http://www.localytics.com/>, (Accessed: Jul. 18, 2013), 12 pgs.
"Mobile Web", Wikipedia:, [Online] retrieved from the internet:https://en.wikipedia.org/w/index.php?title=Mobile Web&oldid=643800164, (Jan. 23, 2015), 6 pgs.
"More than android analytics", UserMetrix, [Online]. Retrieved from the Internet: <URL: http://usermetrix.com/android-analytics>, (Accessed: Jul. 18, 2013), 3 pgs.
"More Than Mobile Analytics", Kontagent, [Online]. Retrieved from the Internet: <URL: http://www. kontagent. com/>, (Accessed: Jul. 18, 2013), 9 pgs.
"Multimap", Wikipedia, [Online]. Retrieved from the Internet: <URL: https://en.wikipedia.org/w/index.php?title=Multimap&oldid=530800748>, (Jan. 1, 2013), 2 pgs.
"Netherlands Application Serial No. 2012417, Netherlands Search Report dated Sep. 18, 2015", W/ English Translation, 9 pgs.
"Netherlands Application Serial No. 2012421, Netherlands Search Report dated Sep. 18, 2015", 8 pgs.
"Netherlands Application Serial No. 2012438, Search Report dated Sep. 21, 2015", 8 pgs.
"New Zealand Application Serial No. 622473, First Examination Report dated Mar. 27, 2014", 3 pgs.
"New Zealand Application Serial No. 622473, Office Action dated Jun. 19, 2014", 2 pgs.
"New Zealand Application Serial No. 622513, Office Action dated Apr. 3, 2014", 2 pgs.
"New Zealand Application Serial No. 628161, First Examination Report dated Aug. 25, 2014", 2 pgs.
"Piwik—Free Web Analytics Software", Piwik, [Online]. Retrieved from the Internet: <URL:http://piwik.org/>, (Accessed: Jul. 19, 2013), 18 pgs.
"Realtime Constant Customer Touchpoint", Capptain—Pilot your apps, [Online] retrieved from the internet: <http://www.capptain.com>, (accessed Jul. 18, 2013), 6 pgs.
"Refresh CSS ellipsis when resizing container", Stack Overflow, [Online]. Retrieved from the Internet: <URL: http://stackoverflow.com/questions/17964681/refresh-css-ellipsis-when-resizing-container>, (Accessed: May 18, 2015), 1 pg.
"SAP BusinessObjects Explorer Online Help", SAP BusinessObjects, (Mar. 19, 2012), 68 pgs.
"Visualizing Threats: Improved Cyber Security Through Network Visualization", Keylines.com, [Online] retrieved from the internet: http://keylines.com/wp-content/uploads/2014/04/Visualizing-Threats1.pdf>, (May 12, 2014), 10 pgs.
"Welcome to StatCounter—Visitor Analysis for Your Website", StatCounter, [Online]. Retrieved from the Internet: <URL: http://statcounter.com/>, (Accessed: Jul. 19, 2013), 17 pgs.
Andrew, G. Psaltis, "Streaming Data—Designing the real-time pipeline", vol. MEAP V03, (Jan. 16, 2015), 16 pgs.
Celik, T, "CSS Basic User Interface Module Level 3 (CSS3 UI)", Section 8; Resizing and Overflow, [Online] retrieved from the internet: <http://www.w3.org/TR/2012/WD-css3-ui-20120117/#resizing-amp-overflow>, (Jan. 17, 2012), 1-58.
Chaudhuri, Surajit, et al., "An Overview of Business Intelligence Technology", Communications of the ACM, vol. 54, No. 8., (Aug. 2011), 88-98.
Cohn, David, et al., "Semi-supervised Clustering with User Feedback", Cornell University, (2003), 9 pgs.
Gill, Leicester, et al., "Computerised linking of medical methodological guidelines", 3rournal of Epidemiolog and Coimmunity Health 47, (1993), pp. 316-319.
Gorr, et al., "Crime Hot Spot Forecasting: Modeling and Comparative Evaluation", Grant 98-IJ-CX-K005, (May 6, 2002), 37 pgs.
Gu, Lifang, et al., "Record Linkage: Current Practice and Future Directions", (Jan. 15, 2004), 32 pgs.
Hansen, D., et al., "Analyzing Social Media Networks with NodeXL: Insights from a Connected World", Chapter 4 & Chapter 10, (Sep. 2010), 38 pages.
Hua, Yu, et al., "A Multi-attribute Data Structure with Parallel Bloom Filters for Network Services", HiPC 2006, LNCS 4297, (2006), 277-288.
Jan-Keno, Janssen, "Wo bist'n du?—Googles Geodienst Latitude", Not in English, [Online] retrieved from the internet:http://www.heise.de/artikel-archiv/ct/2011/03/086/@00250@/ct.11.03.086-088.pdf, (Jan. 17, 2011), 86-88.
Manno, et al., "Introducing Collaboration in Single-user Applications through the Centralized Control Architecture", (2010), 10 pgs.
Phillip, J Windley, "The Live Web: Building Event-Based Connections in the Cloud", Course Technology PTR, (Dec. 21, 2011), 61 pgs.
Sigrist, Christian, et al., "PROSITE, a Protein Domain Database for Functional Characterization and Annotation", Nucleic Acids Research, vol. 38, (2010), D161-D166.
Valentini, Giorgio, et al., "Ensembles of Learning Machines", Lecture Notes in Computer Science: Neural Nets, Springer Berlin Heidelberg, (Sep. 26, 2002), 3-20.
Wang, Guohua, et al., "Research on a Clustering Data De-Duplication Mechanism Based on Bloom Filter", IEEE, (2010), 5 pgs.
Winkler, William E, et al., "Record Linkage Software and Methods for Merging Administrative Lists", Bureau of the Census Statistical Research Division: Statistical Research Report Series, No. RR2001/03, (Jul. 23, 2001), 11 pgs.

* cited by examiner

METRIC COLLECTION AND AGGREGATION FOR DISTRIBUTED SOFTWARE SERVICES

CROSS-REFERENCE TO RELATED APPLICATION

This application claims priority to and the benefit of U.S. Provisional Patent Application No. 62/478,379, filed on Mar. 29, 2017, which is incorporated herein by reference.

TECHNICAL FIELD

The present disclosure generally relates to the technical field of software metrics and, more specifically, deployment, usage, and operation metrics for software operating on distributed computer systems.

BACKGROUND

Metrics regarding a software product (e.g., current deployment, usage, version information, environment information, etc.) can be helpful to infrastructure administrators, developers, and the like. For example, metrics can assist individuals in such things as: identifying software bugs; identifying areas of product improvements; monitoring infrastructure utilization; assessing deployment/usage of different software product versions; determining user retention by certain software products; identifying which software product features are being used and by which users; and targeting software upgrades and critical bug fixes.

When a software product is deployed and operated across a distributed computer system as a plurality of software services, collection and aggregation of metrics for that software product can be a challenge. This is especially true when dealing with several different software products that may utilize different metrics collection/aggregation methods, and when deployment and operation of a software product is scaled up to be highly available (e.g., to serve more users or serve more tenants).

BRIEF DESCRIPTION OF THE DRAWINGS

Various ones of the appended drawings merely illustrate example embodiments of the present disclosure and are not intended to limit its scope to the illustrated embodiments. Rather, these examples are intended to cover alternatives, modifications, and equivalents as may be included within the scope of the present disclosure.

DETAILED DESCRIPTION

Figure 1:
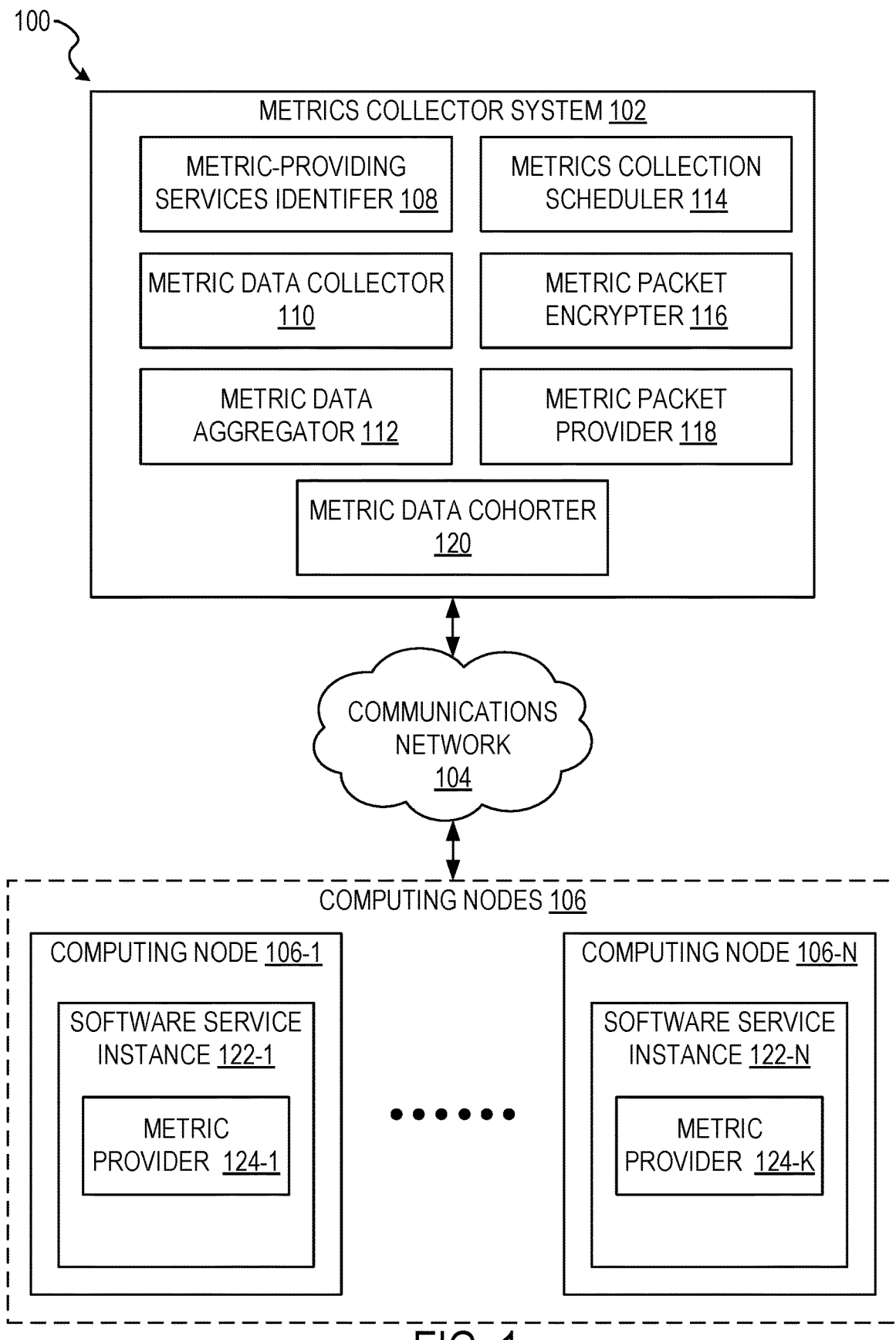
FIGS. 1 and 2 are block diagrams illustrating example systems for metrics collection and aggregation, according to some embodiments of the present disclosure.

Reference will now be made in detail to specific embodiments of the present disclosure. Examples of these specific embodiments are illustrated in the accompanying drawings, and specific details are set forth in the following description in order to provide a thorough understanding of the subject matter. These examples are not intended to limit the scope of the claims to the illustrated embodiments but, rather, are intended to cover such alternatives, modifications, and equivalents as may be included within the scope of the disclosure. Whenever possible, the same reference numbers will be used throughout the drawings to refer to the same or like parts.

Various embodiments described herein are directed to, among other things, systems and methods of metrics collection and aggregation for a software service that is deployed and operating on a plurality of computing nodes (e.g., servers) as separate software service instances (e.g., as microservices). As noted herein, such a deployment of a software service can enable its high availability for use by end users. A software service instance at each computing node can locally calculate its associated metrics (e.g., "Product Version by Deployment," "Weekly/Daily Users," "User Retention," "Data Sets Processed," etc.) and, upon request, provide those calculated metrics to a metrics collector, which may be operating on a separate computing node. The metrics collector, in turn, can collect such calculated metrics from multiple software service instances and aggregate them together (e.g., into a metric packet). For some embodiments, the metrics collector aggregates the collected metrics based on at least service identifiers, timestamps, and metric names (e.g., unique metric name for each metric value calculated by the metric provider capability). In doing so, various embodiments can aggregate and de-duplicate metrics across highly-available software service instances. The metrics collector can provide the aggregated metrics for various uses including, for instance, a usage dashboard.

Some embodiments are implemented by way of a metric provider library and by way of a metrics collector. The metrics collector may comprise a software service that may be deployed to a computing node as a software service instance. The metric provider library may be included and consumed by a software service (e.g., of a given software product) to record and calculate metrics for an instance of the software service operating on a computing node. Additionally, the metrics provider library may be agnostic such that its inclusion and consumption by a software service is not dependent on the type of the software service. The metrics provider library may permit the software service instance to report metrics at a standard end-point, which may be encrypted to only allow authorized users to collect metrics. The library may permit the software service instance to report metrics in a standard format to assists in metric aggregation (by the metrics collector). The library may also permit a highly available software product including the software service to handle metrics. In this way, various embodiments handle metrics collection and aggregation across different computing nodes operating instances of the same software service.

The metrics collector may be deployed (e.g., installed or loaded to operate) to one or more computing nodes by way of a software service deployment manager. The software service deployment manager may discover and identify (e.g., over a communications network) software service instances that include and use the metric provider library to provide metrics. The software service deployment manager can provide the discovery information to the metrics collector, which can use it to contact individual software service instances and collect from them their respective calculated metrics. As noted herein, the metrics collector can aggregate the collected metrics for further purposes (e.g., track software bugs, determine user retention by a software product or feature, etc.). The metrics collector may also report the collected metrics into a database, thereby allowing for the computing and tracking of historical metrics (user retention over a year, version of a software product as of last month, etc.).

As used herein, a computing node can include any computer system (e.g., server, desktop, or laptop), smartphone, personal assistant digital (PDA) device, or other device having a hardware processor. A computing node may be part of a cluster of computing nodes. Additionally, a computing node can comprise a virtual computer (or virtual machine) operating on a physical computer system, which may be hosting several virtual computers. The virtual machine may be one hosted on or using cloud-based infrastructure. As used herein, an instance of a software application or software service can refer to a copy of some or all of the software application or software service, which may be loaded into memory of a computing node for operation (e.g., to be run). As used herein, a service identifier can identify a set of instances of a particular software service. As disclosed herein, a software application product ("software product") can be deployed (e.g., to a plurality of computing nodes) as a plurality of software service instances, which can enable the software product's high availability for use by multiple end users.

As used herein, a metric can include a metric relating to deployment, operation, or usage of a software product, where the software product may be implemented in whole or in part as a set of software services. Example metrics may be based on software products, software product versions, user identifiers, anonymized user identifiers, user activity, time periods, data sets, deployments, computing nodes, customers, or some combination thereof. Example metrics calculated with respect to an instance of a software service may include, without limitation, product version by deployment, users by product version, weekly unique users, daily unique users, weekly active users, daily unique users, user retention, data set managed or processed, number of customers by software service or software product, and number of users by software service or software product.

Various embodiments disclosed herein can address current challenges in the art. For example, it can be problematic to collect metrics for software products that are deployed as a plurality of software service instances (e.g., microservices) operating across a plurality of computing nodes (e.g., a software service distributed across multiple computing nodes for high availability purposes). For instance, a given software product may comprise multiple instances (e.g., forty or sixty) of different software services operating on different computing nodes (e.g., different software services to implement different software product features operating on different servers). Since these software service instances are operating on different computing nodes (e.g., servers), it can be difficult to determine collective metrics (e.g., deployment, operation, usage metrics) for a software product, especially when multiple computing nodes are involved in serving a particular end user's different requests to the software product.

For instance, with respect to a given software product including a particular software service, a first request for a data set from an end user may go to an instance of the particular software service operating on a first computing node, while a second request for the same data set from the end user may end up going another instance of the particular software service operating on a second computing node. Both computing nodes consider the end user a single user, but accurate metrics for counting the end users of the given software product should only count that particular user once. Various embodiments can address such a challenge.

Another challenge addressed by some embodiments is that different types of software services (e.g., different microservices that implement a particular software product) may not handle metrics in a common manner (e.g., common metric language). This can make it difficult to determine such things as how many people are using a given software product made of different software services, or how many data sets are being acted upon by different software service instances of the given software product.

Another challenge addressed by various embodiments is that different software products may utilize different metrics collection/aggregation methods. For example, one software product may choose to compute metrics every time an end user makes a request and store these metrics in its local database, and another software product may choose to compute metrics only when asked to do so by some external entity. This can make aggregating metrics collected from different software products also a challenge.

The following describes particular embodiments with reference to FIGS. 1 through 7.

FIG. 1 is a block diagram illustrating an example system 100 for metrics collection and aggregation, according to some embodiments of the present disclosure. As shown, the system 100 includes a metrics collector system 102, a communications network 104, and computing nodes 106-1 through 106-N (collectively referred to as computing nodes 106). The metrics collector system 102 comprises a metric-providing services identifier 108, metric data collector 110, a metric data aggregator 112, a metrics collection scheduler 114, a metric packet encrypter 116, a metric packet provider 118, and a metric data cohorter 120. The metrics collector system 102 may represent a computing node that is operating a metrics collector software service instance. Operating on each of the computing nodes 106 is a software service instance 122-$i$, and each software service instance 122-$i$ includes its own metric provider 124-$i$ component. Each of the software service instances 122-1 through 122-K can represent an instance of a similar or different software service. According to some embodiments, each metric provider 124-$i$ represents a common metric providing capability possessed its software instance 122-$i$. For some embodiments, the metrics collector system 102 represents a system (e.g., operating on a computing node from the computing nodes 106) that collects metrics from one or more of the metric providers 124 and then aggregates the metric for subsequent use (e.g., software usage dashboard support).

Though not shown, each of the computing nodes 106 may include more than one software service instance, and some or all of the software service instances operating on the computing nodes 106 may be for different software service. Various embodiments described herein can include more or less components than those illustrated in FIG. 1.

The communications network 104 can be any type of network, including: a local area network (LAN), such as an intranet; a wide area network (WAN), such as the Internet; or some combination thereof. Further, the communication network 104 can be a public network, a private network, or some combination thereof. The communication network 104 may be implemented using any number of communication links associated with one or more communication service providers, including one or more wired communication links, one or more wireless communication links, or some combination thereof. Additionally, the communication network 104 may be configured to support the transmission of data formatted using any number of protocols.

Multiple computer systems can be connected to the communication network 104. A computer system can be any type of general device including a processor and capable of network communication with another computer system. For instance, a computer system may be a computing node in a data center, a personal computer system such as a desktop or workstation; or a portable computing device, such as a laptop, smart phone, or tablet personal computer (PC). A computer system can include some or all of the features, components, and peripherals of the machine 700 of FIG. 7.

The communications network 104 communicatively couples the metrics collector system 102 to the computing nodes 106. Through the communications network 104, the metrics collector system 102 may directly or indirectly communicate with one or more of the computing nodes 106.

Referring now to the metrics collector system 102, according to some embodiments, the metric-providing services identifier 108 identifies a set of software service instances that include a metric provider capability and that are operating on a plurality of computing nodes. As used herein, a metric-providing software service instance refers to a software service instance that includes a metric provider capability as described herein. According to some embodiments, a metric-providing software service instance uses its metric provider capability to calculate various types of metrics for the metric-providing software service instance at the computing node upon which it is operating. The metric can relate to the operation, deployment, usage, or some other form of information relating to the metric-providing software service instance as it exists on the computing node. Examples metrics can include, without limitation, the number of unique users (e.g., overall users or by user group [admin group, customer group, developer group, etc.]) using the software service instance over a time period (e.g., over previous day, or over previous week), the user identifiers of unique users using the software service instance over a time period (e.g., over previous day, or over previous week), the software version information associated with the metric-providing software service instance (e.g., version of the software product to which the software service belongs, or version of the software service), and the number of data sets managed or processed by the metric-providing software service instance (e.g., where the instance deals with analyzing data sets).

One or more of the metrics (e.g., metric values) calculated by the metric provider capability can be collected as pre-calculated metric data. In addition to including a value for a calculated metric, the pre-calculated metric data may include standard data for every metric calculated by the metric provider capability. For instance, for each metric calculated (e.g., number of unique users, number of data sets managed, etc.), the pre-calculated metric data includes a metric name, timestamp, and a service identifier associated with the software service instance. As used herein, a software service identifier can be an identifier (e.g., SSID#1, SSID#2, SSID#3, etc.) uniquely associated with a set of instances of a particular software service operating across a set of computing nodes (e.g., three instances of software service B operating on three separate computing nodes can share a software service identifier). For some embodiments, the metric data aggregator 112 utilizes the standard data included in the pre-calculated data (e.g., metric name, timestamp, software service identifier) obtained from each software service instance to aggregate the metrics together. This enables some embodiments to report metrics of software service instances operating across different computing nodes from a software service level (e.g., by software service identifier) rather than (or in addition to) a computing node level (e.g., by computing node level). Each metric-providing software service instance may provide the pre-calculated metric data to a metric data collector 110 upon request.

Continuing with the metric-providing services identifier 108, identifying the metric-providing software service instances may limited to a certain set of computing nodes, may limited to a particular communications network, may be limited to certain software service identifiers, or may be limited to certain software products (e.g., that are each deployed as a set of software service instances). Additionally, for some embodiments, identifying the metric-providing software service instances involves obtaining identification data for the metric-providing software service instances, such as a location (e.g., a universal resource locator). For instance, the metric-providing services identifier 108 may obtain a list of universal resource locators (URLs) (e.g., HTTPs links) to metric-providing software service instances. Such URLs may be to the location from which pre-calculated metric data can be obtained from a specific metric-providing software service instance, or the location where the pre-calculated metric data is stored.

For some embodiments, the metric-providing services identifier 108 may obtain the identification data for the metric-providing software service instances (e.g., URLs) by requesting such information from an entity that can discover or otherwise track such metric-providing software service instances deployed across a plurality of computing nodes. For instance, the request may be submitted to a software service deployment manager described herein, which may monitor for such software service instances (e.g., know what nodes are running which instances), may maintain a registry of such software service instances (e.g., instances register their metric-providing capability with the manager), and may cause deployment of such software service instances to computing nodes (e.g., the manager causes instances to spin up and spin down on nodes). In response to the request, the metric-providing services identifier 108 may receive from the entity (e.g., software service deployment manager) response data that includes identification of the metric-providing software service instances. For some embodiments, the entity that can discover or otherwise track such metric-providing software service instances may be operating on the same computing node as the metrics collector system 102.

Depending on the embodiment, a particular metric-providing software service instance may compute metrics on demand. For instance, the metrics collector system 102 may offer endpoints that when triggered, cause the metrics collector system 102 to send a metric-computation request to the particular metric-providing software instance, which responds by the particular metric-providing software instance computing the request metric(s) on demand. The endpoint may be triggered, for example, upon request by a URL associated with endpoint. Different endpoints may relate to metrics collected by the particular metric-providing software instance based on different time periods (e.g., collected by week or by day). Additionally, the metrics collector system 102 may maintain a preset schedule according to which the metrics collector system 102 causes the endpoints to run, thereby causing metrics to be computed by specified metric-providing software instances according to the preset schedule. Generally, the pre-calculated metric data for a particular metric-providing software service instance is generated in advance of collection by the metrics collector system 102 (e.g., via the metric data collector 110).

Certain metrics (e.g., ones that utilize less processing resources) may be calculated by the metric-providing software service instance more often than others. For instance, a metric-providing software service instance may calculate certain metrics daily, weekly, or per a minute, while others may be performed less often (e.g., monthly). The set of metrics calculated by a metric-providing software service instance may be limited to those supported by the metric provider capability included.

For some embodiments, the metric data collector 110 utilizes the identification data for the metric-providing software service instances, obtained by the metric-providing services identifier 108, to collect pre-calculated metric data from at least one of the metric-providing software service instances identified by the identification data. For instance, as described herein, the identification data may comprise a set of URLs for requesting the pre-calculated metric data from individual metric-providing software service instances, or a set of URLs to where the pre-calculated metric data is stored for individual metric-providing software service instances (e.g., storage location on the computing node operating a metric-providing software service instance). For some embodiments, access to the pre-calculated metric data provided by one or more of the metric-providing software service instances is access controlled. Such embodiments, the metric data collector 110 may need to obtain or already possess proper permissions (e.g., credentials) to access the pre-calculated metric data. The access control may be managed by various entities including, but not limited to, a software service deployment manager, or a central access control system. Each individual metric-providing software service instance may be responsible for checking the access permission of the metric data collector 110 before providing it provides its pre-calculated metric data. In some embodiments, various metric-providing software service instances may not require any permission checking by the metric-providing software service.

For some embodiments, the metric data cohorter 120 may group the pre-calculated metric data collected by the metric data collector from the metric-providing software service instances. Each metric produced by a metric-providing software service instance may contain a cohortable field that indicates whether the metric should be or not be included in the cohorting operation. Based on the value of the cohortable field, the metric data cohorter 120 can group metrics by the appropriate cohorts. For instance, the list of user identifiers that used a service over the last week may be divided into the following: (1) the list of all user identifiers that used the service; (2) the list of service user identifiers that used the service; (3) the list of developer user identifiers that used the service; and (4) the list of customer user identifiers that used the service. As used herein, "service users" can include users that represent the software instances or computing machines that talk to one another. For instance, when software service 1 makes a request to software service 2, it makes it as the "software service 1 user." This request may be considered usage in software service 2 but this not considered to be human usage. Accordingly, with the cohortable field, various embodiments can, for instance, split up software service usage into software service usage, developer usage, and customer usage. The cohorts of developer users and service users may be defined based on user or group organization, which may be maintained by a central user-management system (not shown). For some embodiments, the metric data cohorter 120 generates a blacklist or cohort metrics so that downstream consumers of the metrics can be transparently aware of what cohorts were used to break out the usage metrics. In this way, such embodiments can, for example, report "all developer users at deployment" or "all service users at deployment" metrics so that consumers, such as a database, can know what the basis of the cohort operation.

For some embodiments, a metric-providing software service instance may have constraints or requirements on the grouping of users into cohorts. The metrics-provider service may therefore mark the metrics to not be grouped into a cohort. The metric data cohorter service will not group the metric data collected from the metrics-provider service with other collected metric data, and the metric data (including cohort information) generated by the metrics-provider will pass through the metric data cohorter service.

For various embodiments, the metric data aggregator 112 aggregates the pre-calculated metric data collected by the metric data collector 110 from the metric-providing software service instances. The metric data aggregator 112 may aggregate the pre-calculated metric data based on (e.g., according to) software service identifiers, timestamps, and metric names included in the pre-calculated metric data collected from each metric-providing software service instances. In this way, various embodiments can report metrics of software service instances operating across different computing nodes from a software service level (e.g., by software service identifier) rather than (or in addition to) a computing node level (e.g., by computing node level).

In particular, for some embodiments, metric values in the pre-calculated metric data that share a common software service identifier, timestamp, and metric name are aggregated together (e.g., added together) to produce an aggregated metric value in association with that common software service identifier, timestamp, and metric name.

As part of the aggregation process, the metric data aggregator 112 may first determine a method of aggregation for a particular metric value, and then apply that method of aggregation on the metric values provided by the pre-calculated metric data. For some embodiments, the method of aggregation is included with the pre-calculated metric data (e.g., provided in association each metric value). An example method of aggregation can include count the union, whereby metric values associated with a particular metric name are merged (or unioned) together, and a count is performed on the resulting merged set. Another example method of aggregation can include taking the metric value of a particular metric name associated with a particular software service identifier. For example, such an aggregation method may be used with respect to a metric relating to software service version when one can assume that the same software service version is being used by all service software instances associated to a particular same software service identifier.

The metric data aggregator 112 may generate a metric packet based on aggregation of the pre-calculated metric data collected by the metric data collector 110. Additionally, the metric data aggregator 112 may generate a separate metric packet for each software service (e.g., software service identifier) or for each software product. In this way, a metric packet aggregates the relevant metric values for a software service or a software product that is operating across multiple computing nodes.

The metric packet may be formatted in a manner that permits various software products and software services to consume and use. For instance, the metric packet may be consumed and utilized by a dashboard service, which may generate visual dashboard representing the aggregated metric values. The aggregated metric values in the metric packet can provide such information as: unique users per a software service over a time period (e.g., day, week, month); user retention over a period of time; how many different versions of a certain software product or service are deployed; how many unique users per a version of a certain software product or service; number of data set managed by a certain software product or service; software products or services per a deployment identifier; customer users per a software product or service; and the like.

For some embodiments, the metric packet may be enriched with additional information, such as a deployment identifier associated with the metrics collector system 102. As noted herein, a deployment identifier may uniquely identify an exclusive group of software service identifiers. A particular deployment identifier may be associated with a particular group of users, such a user group associated with a particular customer using software services or products. There may be a separate metrics collection system 102 for each deployment identifier. This can facilitate the segregation of aggregated metric data between different deployment identifiers (e.g., for security purposes, or for admin purposes).

According to some embodiments, the metrics collection scheduler 114 causes the metrics collector system 102 to collect and aggregate metrics from certain metric-providing software service instances according to a predetermined schedule (e.g., date, time, day of the week, day of the month, etc.). A given predetermined schedule may apply to only a set of certain software products, certain software services, certain software service identifiers, or certain deployment identifiers (which may identify an exclusive group of software service identifiers). For example, according to a particular schedule, the metrics collection scheduler 114 may cause the metric-providing services identifier 108 to identify metric-providing software service instances, cause the metric data collector 110 to obtain pre-calculated metric data from the metric-providing software service instances associated with certain software service identifiers, and cause the metric data aggregator 112 to aggregate the collected pre-calculated metric data. Alternatively, the metrics collection scheduler 114 may cause the metric-providing services identifier 108 to identify metric-providing software service instances, cause the metric data collector 110 to obtain pre-calculated metric data from all the metric-providing software service instances identified by the metric-providing services identifier 108, and cause the metric data aggregator 112 to aggregate the collected pre-calculated metric data.

For some embodiments, the metric packet encrypter 116 encrypts a plain text metric packet produced by the metric data aggregator 112 before the metric packet is transmitted for consumption by another software product or service. This can ensure secure communication of metric data over unsecure communications channel (e.g., through e-mail).

For various embodiments, the metric packet provider 118 send the metric packet produced by the metric data aggregator 112 (and possibly encrypted by the metric packet encrypter 116) to software product or service, which may consume the metric packet and make user of the aggregated metric contained there. For example, the metric packet provider 118 may e-mail an encrypted metric packet to a central database service, which may provide the metric data to service software metric queries (e.g., for dashboard generation or sending alerts based upon certain metric conditions). In another example, the metric packet provider 118 may push the data to a software product or service via an application program interface (API) of that product or service. The metric packet provider 118 may send the metric packet to certain destinations (e.g., a database) according to a predetermined schedule.

The metric packet provider 118 may push the metric packet to a local file on the server that the metrics collector system 102 is operating on. In some embodiments, the metric packet is be encrypted. Additionally, in some embodiments, some software services are restricted from connecting to the Internet for security reasons, thereby permitting a human user to manually submit encrypted metrics to a central database or server.

Any one or more of the functional components illustrated in FIG. 1 (e.g., 108 through 118) and described herein may be implemented using hardware (e.g., a hardware processor of a machine) or a combination of hardware and software. For example, any one of the components described herein may configure a hardware processor to perform the operations described herein for that component. Moreover, any two or more of these components may be combined into a single component, and the functions described herein for a single component may be subdivided among multiple components. Furthermore, according to various example embodiments, any of the functional components illustrated in FIG. 1 may be implemented together or separately within a single machine, database, or device or may be distributed across multiple machines, databases, or devices.

Figure 2:
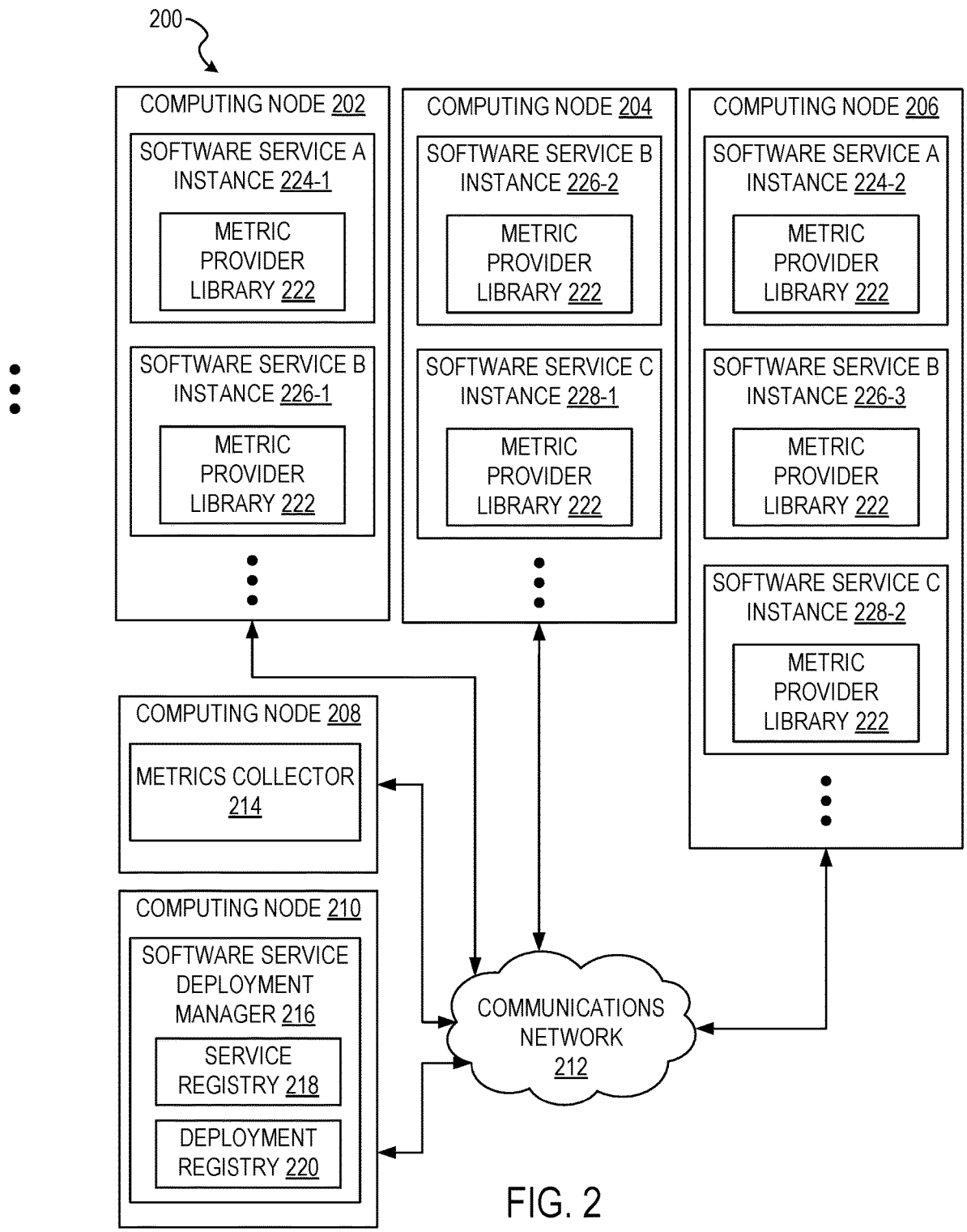

FIG. 2 is a block diagram illustrating an example system 200 for metrics collection and aggregation, according to some embodiments of the present disclosure. As shown, the system 200 includes a plurality of computing nodes 202, 204, 206, 208, and 210. The computing nodes 202, 204, 206 can represent computing nodes that operate (e.g., run) software service instances to provide high availability software services to end users (e.g., data set analysis or visualization services). The computing node 208 includes a metrics collector 214. The computing node 210 includes a software service deployment manager 216. The software service deployment manager 216 includes a service registry 218 and a deployment registry 220. Various embodiments described herein can include more or less components than those illustrated in FIG. 2.

The computing nodes 202, 204, 206 includes instances of software services 224, 226, 228, each of which includes a metric provider library 222. In particular, the computing nodes 202 includes an instance 224-1 of software service A, and an instance 226-1 of software service B; the computing node 204 includes an instance 226-2 of software service B, and an instance 228-1 of software service C; and the computing node 206 includes an instance 224-2 of software service A, and an instance 226-3 of software service B, and an instance 228-2 of software service C. For some embodiments, the instances 224-1 and 224-2 of software service A share a common software service identifier (e.g., SSID#1), the instances 226-1, 226-2, and 226-3 of software service B share another common software service identifier (e.g., SSID#2), and the instances 228-1 and 228-2 of software service C share another common software service identifier (e.g., SSID#3). The software service identifier may be one assigned by the software service deployment manager 216, which may cause the deployment of the software service instances onto the computing nodes 202, 204, 206.

As shown, a copy of the metric provider library 222 is included by each instance of software services 224, 226, 228. According to some embodiments, the metric provider library 222 provides a particular software service instance with a metric provider capability described herein. Accordingly, for various embodiments, the metric provider library 222 facilitates implementation of the metric provider 124 of FIG. 1 within the context of the system 200.

The metric provider library 222 may comprise a library of software functions that a software service instance may call to perform or otherwise facilitate calculation of a set of metrics for the software service instance. For example, the metric provider library 222 may comprise a metric analyzer component that generates some or all of the set of metrics for the software service instance. The metric provider library 222 may include a software version analyzer which can determine (e.g., by analyzing some version files of the software service instance) a software service version for the software service instance. The metric provider library 222 may include a log analyzer to analyze lines of a log file generated by the software service instance, which can assist in determining user identifier related metrics (e.g., set of unique user identifiers, number of end users, user retention, etc.). Additionally, analyzers of the metric provider library 222 may vary with frequency in which they operate. For instance, a particular analyzer (e.g., metric, log, version analyzer) may be an hourly, daily, or a weekly analyzer. As note herein, calculation of certain metrics may be more resource intensive then others and this can determine the frequency with which a particular analyzer of the metric provider library 222 is executed.

For some embodiments, the metrics collector 214 represents an implementation of the metrics collection system 102 of FIG. 1 within the context of the system 200. The metrics collector 214 may comprise a software service instance operating on the computing node 208. As a software service, the metrics collector 214 may have been deployed to the computing node 208 by the software service deployment manager 216 operating on the computing node 210.

For some embodiments, the software service deployment manager 216 discovers or otherwise tracks metric-providing software service instances deployed across a plurality of computing nodes. The software service deployment manager 216 may manage deployment of software service instances across the computing nodes 202, 204, 206 (e.g., spin up and spin down instances) and may monitor their operation. As such, the software service deployment manager 216 may know which of the computing nodes 202, 204, 206 are operating which software instances. The software service deployment manager 216 may track deployment of software service instances within its deployment registry 220. An instance of software services 224, 226, 228 may register its capability or functions with the software service deployment manager 216, which may maintain such information on the service registry 218. For some embodiments, each instance of software services 224, 226, 228 registers its metric provider capability with the software service deployment manager 216. Each instance may do this, for example, upon instance start up (e.g., instance broadcasts or advertises one or more of its capabilities) or upon query by the software service deployment manager 216 (e.g., the software service deployment manager 216 querying each instance on their capabilities during a service discovery process). As part of registering its metric providing capability, an instance of software services 224, 226, 228 may provide the software service deployment manager 216 with information on how metric data generated by the instance (e.g., pre-calculated metric data) can be obtained by another entity, such as the metrics collector 214. Examples of such information can include, without limitation, a URL for requesting the metric data from the instance, or a URL to where the metric data is stored. The URL may comprise a HTTPS link, which permits for secure communication of the metric data from the instance to another entity. The URL may represent a standard end-point from which the metrics collector 214 can obtain metric data (e.g., pre-calculated metric data) from a given software service instance.

Figure 6:
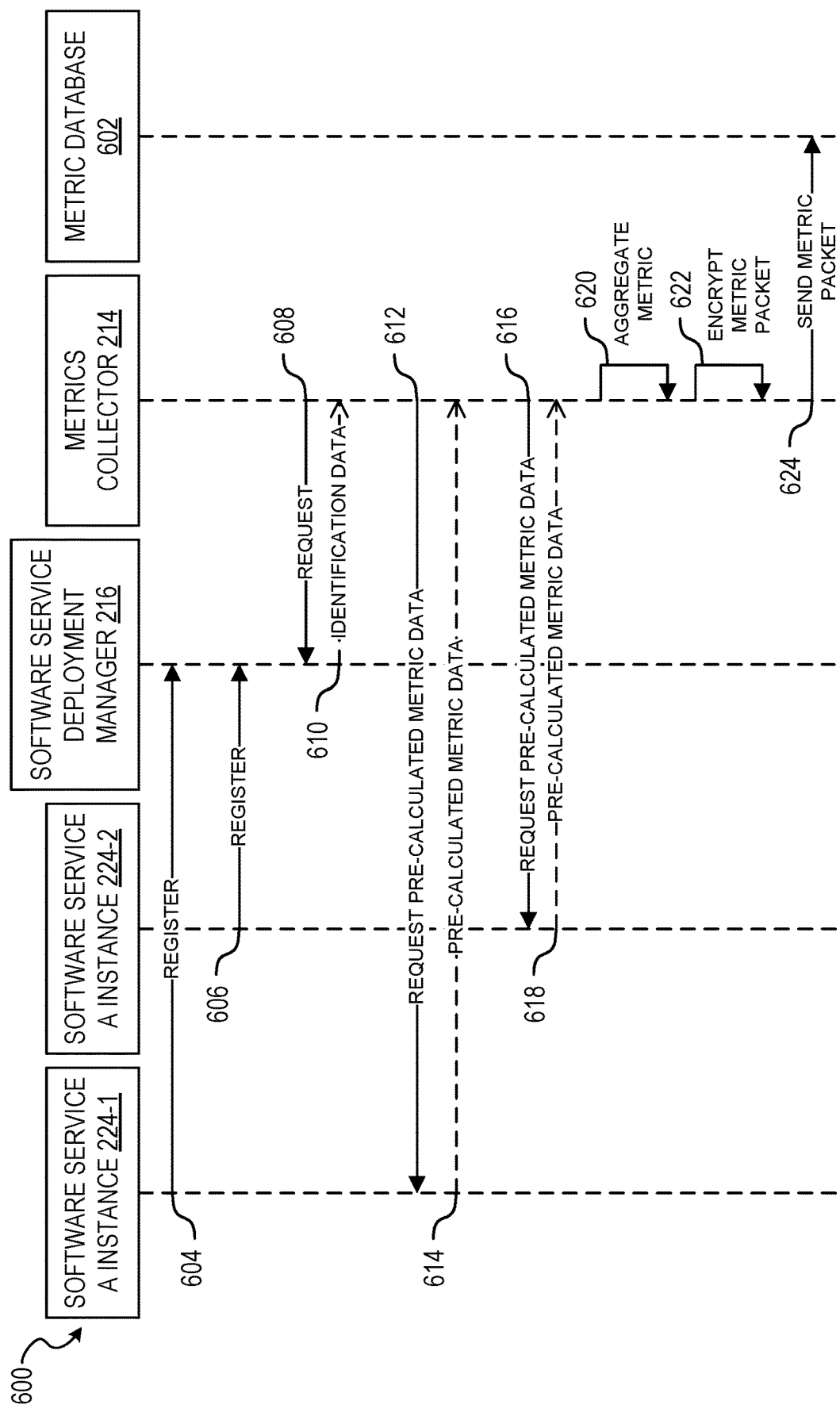
FIG. 6 is a diagram illustrating example interactions during metrics collection and aggregation, according to some embodiments of the present disclosure.

More regarding example operation of the system 200 is described herein with respect to FIG. 6.

Any one or more of the functional components illustrated in FIG. 2 and described herein may be implemented using hardware (e.g., a hardware processor of a machine) or a combination of hardware and software. For example, any one of the components described herein may configure a hardware processor to perform the operations described herein for that component. Moreover, any two or more of these components may be combined into a single component, and the functions described herein for a single component may be subdivided among multiple components. Furthermore, according to various example embodiments, any of the functional components illustrated in FIG. 2 may be implemented together or separately within a single machine, database, or device or may be distributed across multiple machines, databases, or devices.

Figure 3:
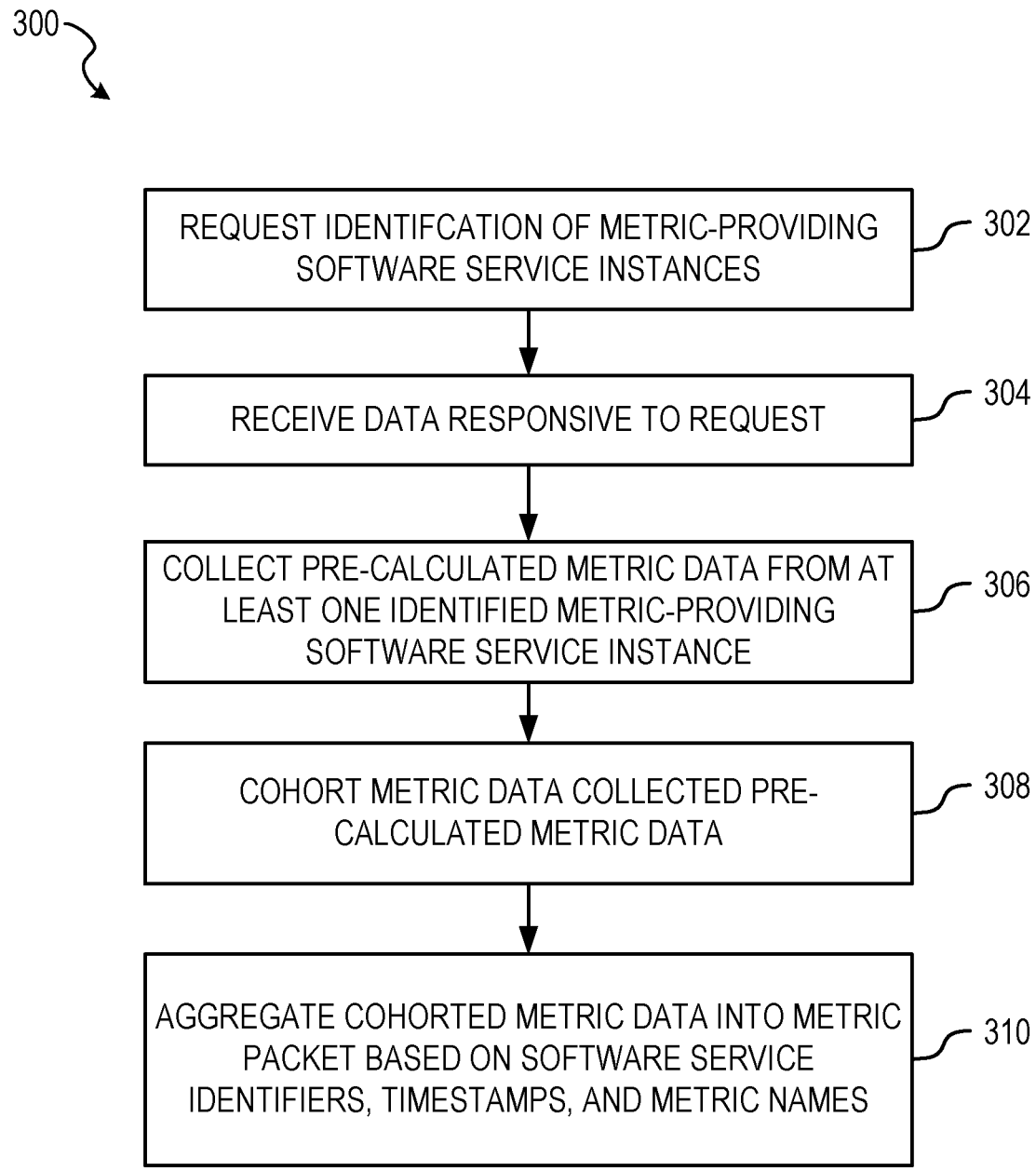
FIGS. 3 through 5 are flowcharts illustrating example methods for metrics collection and aggregation, according to some embodiments of the present disclosure.

FIG. 3 is a flowchart illustrating an example method 300 for metrics collection and aggregation, according to some embodiments of the present disclosure. For some embodiments, the method 300 is performed as part of a metrics collector. An operation of the method 300 (or another method described herein) may be performed by a hardware processor (e.g., central processing unit or graphics processing unit) of a computer system (e.g., desktop, server, etc.).

As shown, the method 300 begins at operation 302 identification of metric-providing software service instances operating on a plurality of computing nodes, each particular metric-providing software service instance including a metric provider. As noted herein, the request may be submitted to an entity that can discover or otherwise track such metric-providing software service instances deployed across a plurality of computing nodes. For instance, the request may be submitted to a service registry, which tracks capabilities of software service instances. In another instance, the request may be submitted to a software service deployment manager described herein, which may monitor for such software service instances (e.g., know what nodes are running which instances), may maintain a registry of such software service instances (e.g., instances register their metric-providing capability with the manager), and may cause deployment of such software service instances to computing nodes (e.g., the manager causes instances to spin up and spin down on nodes). As described herein, the metric provider of a particular metric-providing software service instance can produce pre-calculated metric data for the particular metric-providing software service instance, and can do so by calculating a metric locally at the computing node operating the particular metric-providing software service instance.

The method 300 continues with operation 304 receiving response data in response to the request at operation 302, where the response data includes identification of metric-providing software service instances. For some embodiments, the response data includes a URL for obtaining pre-calculated data for each metric-providing software service instance. As described herein, the URL may represent a standard end-point from which pre-calculated data from a metric-providing software service instance, and the response data provides that standard end-point (e.g., to a metrics collection system 102).

The method 300 continues with operation 306 collecting pre-calculated metric data from at least one metric-providing software service instance identified by the response data received by operation 304. For some embodiments, the collection of the pre-calculated metric data may be based on a pre-determined schedule (e.g., by minute, daily, weekly) or upon a manual trigger (e.g., request to the metrics collection system 102 by a URL). For instance, a request to one URL may cause the collection (and subsequent aggregation) of pre-calculated data that are calculated by the metric-providing software instances on a daily basis, and another URL may cause the collection (and subsequent aggregation) of pre-calculated data that are calculated by the metric-providing software instances on a weekly basis. As noted herein, collection of pre-calculated data may involve access control (e.g., the metrics collection system 102 would need proper credentials to collect the pre-calculated data).

The method 300 continues with operation 308 cohorting pre-calculated metric data, collected by operation 306. For some embodiments, operation 308 requests and obtains (from a centralized user or group membership management system) a list of developer users or a list of service users. Using one or both of the lists, the metric data cohorter 120 can group metrics into multiple cohorts as described herein. For instance, if a metric is marked as cohortable, then the metric may be broken out into service usage, developer usage, and customer usage. For some embodiments, metrics marked as cohortable only include user identifiers in their values. The metric data cohorter 120 can then group metrics into cohorts without needing to determine what is represented by the cohortable metric. Accordingly, the metric data cohorter 120 may group a metric representing all usage into respective cohorts and a metric representing all users who accessed a dataset (e.g., for a service that handles dataset access and retrieval, into respective cohorts).

The method 300 continues with operation 310 aggregating pre-calculated metric data, cohorted by operation 308, based on software service identifiers, timestamps, and metric names included within the pre-calculated metric data. As described herein, in the collected pre-calculated metric data, metric values having a common software service identifier, timestamp, and metric name may be cohorted and aggregated together. As also described herein, the different methods of aggregation may be utilized to aggregate such metric values, and the type of aggregation method may be specified in the pre-calculated metric data. For some embodiments, operation 310 may product a metric packet that contains the aggregated pre-calculated metric data. Additionally, for some embodiments, operation 310 produces a metric packet for each software service, software service identifier, or software product (e.g., comprising a set of software services). The metric packet may be formatted by consumption and use by other software services or software products, such as a software usage dashboard service. The metric packet may be encrypted before it is provided to another software service or software product.

Though the operations of method 300 may be depicted and described in a certain order, the order in which the operations are performed may vary between embodiments. For example, an operation may be performed before, after, or concurrently with another operation. Additionally, the components described above with respect to the method 300 are merely examples of components that may be used with the method 300, and that other components may also be utilized in some embodiments.

Figure 4:
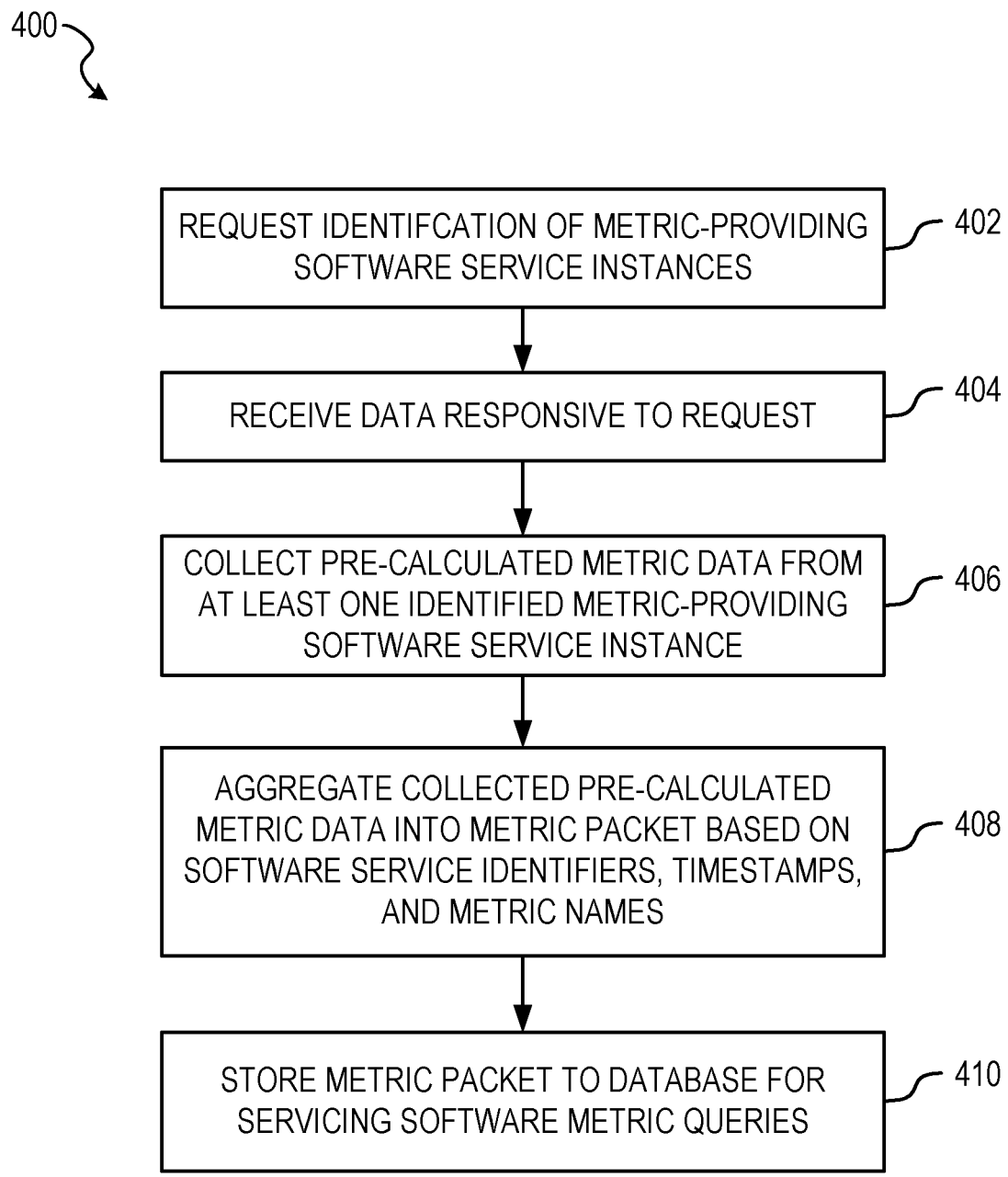

FIG. 4 is a flowchart illustrating an example method 400 for metrics collection and aggregation, according to some embodiments of the present disclosure. For some embodiments, the method 400 is performed as part of a metrics collector. An operation of the method 400 (or another method described herein) may be performed by a hardware processor of a computer system.

As shown, the method 400 begins at operation 402 and continues with operations 404, 406, and 408. For some embodiments, the operations 402, 404, 406, and 408 are similar to operations 302, 304, 306, and 310 of the method 300 described above with respect to FIG. 3.

After operation 408, the method 400 continues with operation 410 storing a metric packet, produced by operation 408, to a database that services software metric queries. As described herein, the database may be one utilized by other software services or software products, such as a software usage dashboard service or a service monitoring service.

Though the operations of method 400 may be depicted and described in a certain order, the order in which the operations are performed may vary between embodiments. For example, an operation may be performed before, after, or concurrently with another operation. Additionally, the components described above with respect to the method 400 are merely examples of components that may be used with the method 400, and that other components may also be utilized in some embodiments.

Figure 5:
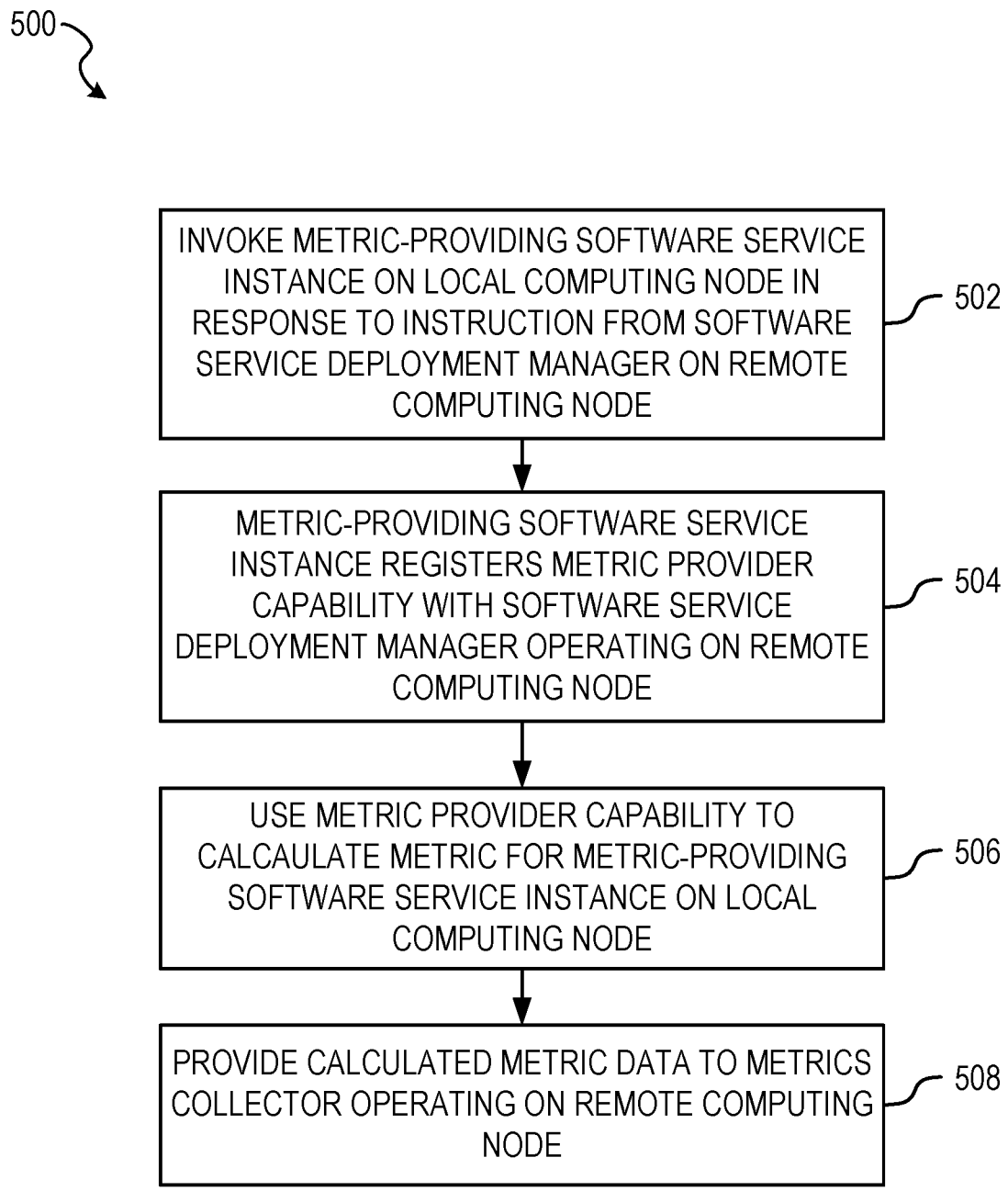

FIG. 5 is a flowchart illustrating an example method 500 for metrics collection and aggregation, according to some embodiments of the present disclosure. For some embodiments, the method 500 is performed as part of a software service instance including a metric provider (e.g., by way of a metric provider library). An operation of the method 500 (or another method described herein) may be performed by a hardware processor of a computer system.

As shown, the method 500 begins at operation 502 invoking a metric-providing software service on a local computing node in response to an instruction from a software service deployment manager operating on a remote computing node. The method 500 continues with operation 504 the metric-providing software service invoked by operation 502 registers its metric provider capability with the software service deployment manager operating. The method 500 continues with operation 506 the metric-providing software service uses its metric provider capability to calculate a metric for the metric-providing software service operating on the local computing node. The method 500 continues with operation 508 providing calculated metric data to a metrics collector operating on a remote computing node. The calculated metric data (which the metrics collector regards as pre-calculated metric data) may be provided to the metrics collector upon request from the metrics collector (e.g., via a URL used by the metrics collector, and provided to the metrics collector by the software service deployment manager).

Though the operations of method 500 may be depicted and described in a certain order, the order in which the operations are performed may vary between embodiments. For example, an operation may be performed before, after, or concurrently with another operation. Additionally, the components described above with respect to the method 500 are merely examples of components that may be used with the method 500, and that other components may also be utilized in some embodiments.

FIG. 6 is a diagram 600 illustrating example interactions during metrics collection and aggregation, according to some embodiments of the present disclosure. In particular, the diagram 600 illustrates interactions between elements of the system 200 of FIG. 2 during example operation according to some embodiments. As shown, the interactions involve the instance 224-1 of software service A, the instance 224-2 of software service A, the software service deployment manager 216, and the metrics collector 214.

During operation, the software service A instance 224-1 registers its metric provider capability at 604 with the software service deployment manager 216, and the software service A instance 224-2 its metric provider capability at 606 with the software service deployment manager 216. Subsequently, at 608, the metrics collector 214 requests from the software service deployment manager 216 the identity of software service instances that include metric providing capabilities. At 610, the software service deployment manager 216 responds to the request with identification data, which would include the identities of the software service A instance 224-1 and the software service A instance 224-2. As described herein, the identification data can include a set of URLs corresponding to individual software service instance that have metric provider capabilities.

At 612, the metrics collector 214 utilizes the identification data from the software service deployment manager 216 to request pre-calculated metric data from the software service A instance 224-1. At 614, the software service A instance 224-1 responds by providing its pre-calculated metric data. Likewise, at 616, the metrics collector 214 utilizes the identification data from the software service deployment manager 216 to request pre-calculated metric data from the software service A instance 224-2. At 618, the software service A instance 224-1 responds by providing its pre-calculated metric data. The requests at 612 and 616 may be may be performed substantially in parallel.

At 620, the metrics collector 214 aggregates the pre-calculated data collected from various the software service instances, including the software service A instance 224-1 and the software service A instance 224-2. For some embodiments, the software service A instance 224-1 and the software service A instance 224-2 have a common software service identifier and accordingly, at 620, the metrics collector 214 may aggregate each metric value in the pre-calculated metric data collected from 224-1 and 224-2 together based on a common metric name and timestamp. The metrics collector 214 may produce a metric packet for the common software service identifier (or the software product associated with the software service identifier). The metric packet may contain the aggregated metric values for the common software identifier, and it may be in plain text. At 622, the metrics collector 214 may encrypt the metric packet in advance of sending the metric packet at 624. At 624, the metrics collector 214 sends (e.g., pushes) the metric packet to a metric database 602, which may execute metric related queries in connection with software services.

Example Machine Architecture and Machine-Readable Medium

Figure 7:
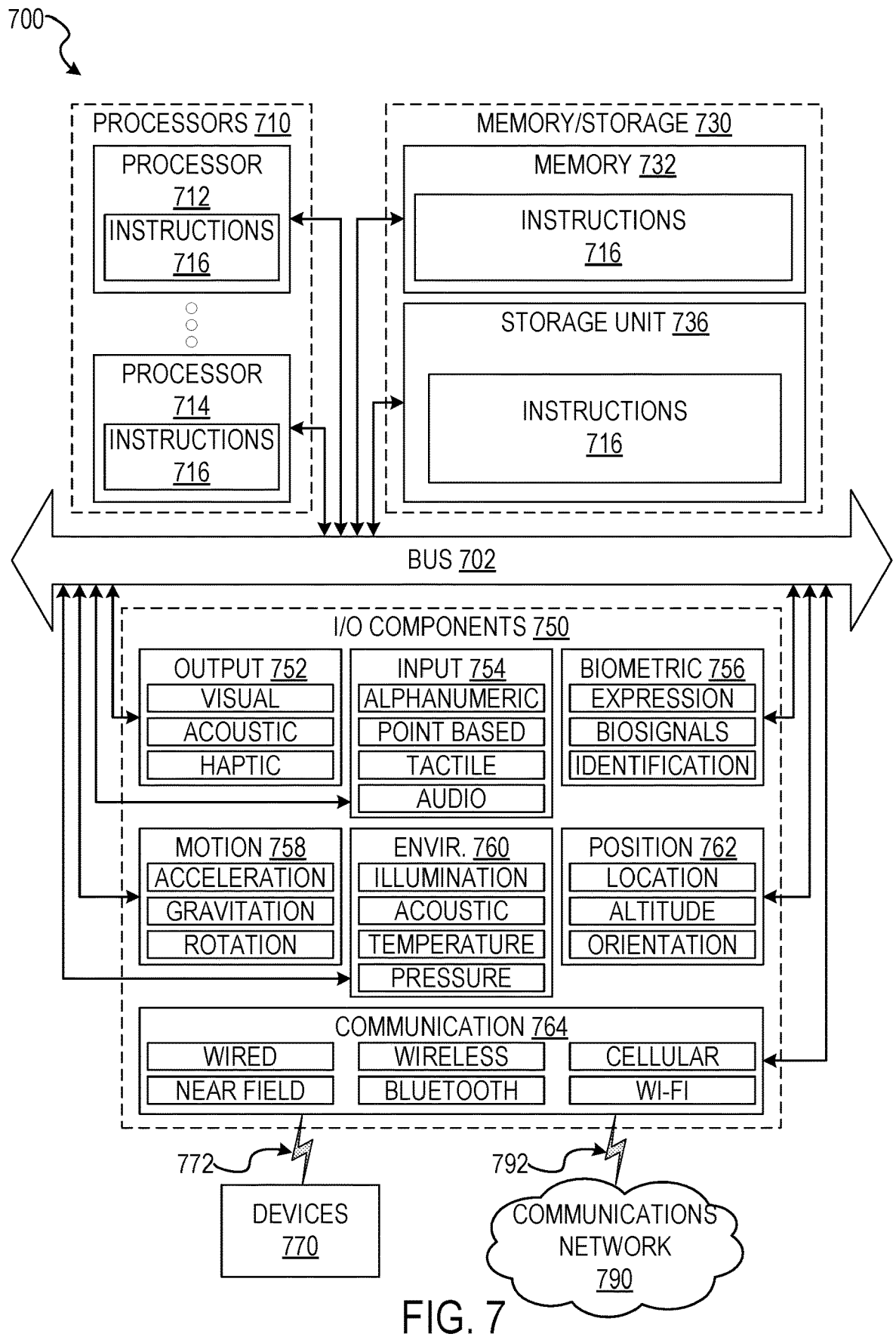
FIG. 7 is a diagrammatic illustrating an example machine in the form of a computer system within which a set of instructions, for causing the machine to perform any methodology discussed herein, may be executed.

FIG. 7 is a block diagram illustrating components of a machine 700, according to some example embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein may be executed. Additionally, or alternatively, the machine 700 may correspond to any one of the metrics collection system 102 or the computing devices 106. The instructions 716 transform the general, non-programmed machine into a particular machine programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 may include processors 710, memory/storage 730, and input/output (I/O) components 750, which may be configured to communicate with each other such as via a bus 702. In an example embodiment, the processors 710 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 712 and a processor 714 that may execute the instructions 716. The term "processor" is intended to include a multi-core processor that may comprise two or more independent processors (sometimes referred to as "cores") that may execute instructions contemporaneously. Although FIG. 7 shows multiple processors 710, the machine 700 may include a single processor with a single core, a single processor with multiple cores (e.g., a multi-core processor), multiple processors with a single core, multiple processors with multiple cores, or any combination thereof.

The memory/storage 730 may include a memory 732, such as a main memory, or other memory storage, and a storage unit 736, both accessible to the processors 710 such as via the bus 702. The storage unit 736 and memory 732 store the instructions 716 embodying any one or more of the methodologies or functions described herein. The instructions 716 may also reside, completely or partially, within the memory 732, within the storage unit 736, within at least one of the processors 710 (e.g., within the processor's cache memory), or any suitable combination thereof, during execution thereof by the machine 700. Accordingly, the memory 732, the storage unit 736, and the memory of the processors 710 are examples of machine-readable media.

As used herein, "machine-readable medium" means a device able to store instructions and data temporarily or permanently, and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 716. The term "machine-readable medium" shall also be taken to include any medium, or combination of multiple media, that is capable of storing instructions (e.g., instructions 716) for execution by a machine (e.g., machine 700), such that the instructions, when executed by one or more processors of the machine (e.g., processors 710), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, the machine-readable medium is non-transitory in that it does not embody a propagating signal. However, labeling the tangible machine-readable medium "non-transitory" should not be construed to mean that the medium is incapable of movement; the medium should be considered as being transportable from one real-world location to another. Additionally, since the machine-readable medium is tangible, the medium may be considered to be a machine-readable storage device.

The I/O components 750 may include a wide variety of components to receive input, provide output, produce output, transmit information, exchange information, capture measurements, and so on. The specific I/O components 750 that are included in a particular machine will depend on the type of machine. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion and the grouping is in no way limiting. In various example embodiments, the I/O components 750 may include output components 752 and input components 754. The output components 752 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 750 may include biometric components 756, motion components 758, environmental components 760, or position components 762 among a wide array of other components. For example, the biometric components 756 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 758 may include acceleration sensor components (e.g., accelerometer), gravitation sensor components, rotation sensor components (e.g., gyroscope), and so forth. The environmental components 760 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 762 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 750 may include communication components 764 operable to couple the machine 700 to a communications network 790 or devices 770 via a coupling 792 and a coupling 772, respectively. For example, the communication components 764 may include a network interface component or other suitable device to interface with the communications network 790. In further examples, the communication components 764 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 770 may be another machine or any of a wide variety of peripheral devices (e.g., a peripheral device coupled via a Universal Serial Bus (USB)).

Moreover, the communication components 764 may detect identifiers or include components operable to detect identifiers. For example, the communication components 764 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF4160, Ultra Code, UCC RSS-2D bar code, and other optical codes), or acoustic detection components (e.g., microphones to identify tagged audio signals). In addition, a variety of information may be derived via the communication components 764, such as location via Internet Protocol (IP) geo-location, location via Wi-Fi® signal triangulation, location via detecting an NFC beacon signal that may indicate a particular location, and so forth.

Modules, Components and Logic

Certain embodiments are described herein as including logic or a number of components (e.g., modules) or mechanisms. Components may constitute either software components (e.g., code embodied on a machine-readable medium or in a transmission signal) or hardware components. A hardware component is a tangible unit capable of performing certain operations and may be configured or arranged in a certain manner. In example embodiments, one or more computer systems (e.g., a standalone, client, or server computer system) or one or more hardware components of a computer system (e.g., a processor or a group of processors) may be configured by software (e.g., an application or application portion) as a hardware component that operates to perform certain operations as described herein.

In various embodiments, a hardware component may be implemented mechanically or electronically. For example, a hardware component may comprise dedicated circuitry or logic that is permanently configured (e.g., as a special-purpose processor, such as a field-programmable gate array (FPGA) or an application-specific integrated circuit (ASIC)) to perform certain operations. A hardware component may also comprise programmable logic or circuitry (e.g., as encompassed within a general-purpose processor or other programmable processor) that is temporarily configured by software to perform certain operations. It will be appreciated that the decision to implement a hardware component mechanically, in dedicated and permanently configured circuitry, or in temporarily configured circuitry (e.g., configured by software) may be driven by cost and time considerations.

Accordingly, the term "hardware" in conjunction with a component should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware components are temporarily configured (e.g., programmed), each of the hardware components need not be configured or instantiated at any one instance in time. For example, where the hardware components comprise a general-purpose processor configured using software, the general-purpose processor may be configured as respective different hardware components at different times. Software may accordingly configure a processor, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple of such hardware components exist contemporaneously, communications may be achieved through signal transmission (e.g., over appropriate circuits and buses that connect the hardware components). In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions. The components referred to herein may, in some example embodiments, comprise processor-implemented components.

Similarly, the methods described herein may be at least partially processor-implemented. For example, at least some of the operations of a method may be performed by one or more processors or processor-implemented components. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product (e.g., software application product), for example, a computer program tangibly embodied in an information carrier, for example, in a machine-readable medium for execution by, or to control the operation of, data processing apparatus, for example, a programmable processor, a computer, or multiple computers.

A computer program (e.g., software application) can be written in any form of programming language, including compiled or interpreted languages, and it can be deployed in any form, including as a standalone program or as a module, subroutine, or other unit suitable for use in a computing environment. A computer program can be deployed to be executed on one computer system or on multiple computer systems at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

A computer system can include clients and servers. A client and server are generally remote from each other and typically interact through a communication network. The relationship of client and server arises by virtue of software application running on the respective computer systems and having a client-server relationship to each other. In embodiments deploying a programmable computer system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Language

Although the embodiments of the present invention have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

This disclosure is intended to cover any and all adaptations or variations of various embodiments. Combinations of the above embodiments, and other embodiments not specifically described herein, will be apparent, to those of skill in the art, upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim.

What is claimed is:

1. A method, comprising:
   requesting, from a software service deployment manager on a first computing node, by a hardware processor, identification of metric-providing software service instances operating on a plurality of computing nodes not including the first computing node, each particular metric-providing software service instance including a metric provider that produces pre-calculated metric data for the particular metric-providing software service instance, wherein the particular metric-providing software service instance registers with the software service deployment manager a metric-providing capability of the particular metric-providing software service instance, the pre-calculated metric data includes a metric calculated for the particular metric-providing software service instance, and the metric is calculated at a particular computing node operating the particular metric-providing software service instance;
   responsive to the requesting, receiving, by the hardware processor, response data from the software service deployment manager on the first computing node, wherein the response data includes identification of the metric-providing software service instances;
   collecting, by the hardware processor, pre-calculated metric data from at least one of the metric-providing software service instances identified by the response data; and
   aggregating, by the hardware processor, the collected pre-calculated metric data into a metric packet, wherein the aggregating is based on software service identifiers, timestamps, metric names, and user identifiers included in the pre-calculated metric data, wherein the collected pre-calculated metric data comprises a first data portion associated with a particular software service identifier and a second data portion associated with the particular software service identifier, wherein the first data portion aggregates metrics generated by first software service instances on at least two different computing nodes while servicing requests for a first user identifier, wherein the second data portion aggregates metrics generated by second software service instances on at least two different computing nodes while servicing requests for a second user identifier, wherein the first software services instances and the second software services instances are associated with the particular software service identifier, wherein the first data portion comprises at least one metric relating to a count of data sets managed by the first software service instances for servicing requests for the first user identifier, and wherein the count of data sets managed by the first software service instances is calculated by counting the first user identifier only once for the first software service instances across two or more different computing nodes.

2. The method of claim 1, wherein the response data is received over a communications network from a software service deployment manager, and the software service deployment manager monitors for metric-providing software service instances operating on a computing node.

3. The method of claim 1, wherein the aggregating is based on software service deployment identifiers, each of which identifies an exclusive group of software service identifiers.

4. The method of claim 1, wherein the response data comprises a universal resource locator (URL) for collecting pre-calculated metric data from the at least one of the metric-providing software service instances.

5. The method of claim 1, wherein the metric comprises software version information for the particular metric-providing software service instance.

6. The method of claim 1, wherein the metric comprises unique users over a time period.

7. The method of claim 1, wherein the metric comprises metrics calculated according to at least one of user identifiers, time, and date.

8. The method of claim 1, comprising storing the metric packet to a database that services software metric queries.

9. The method of claim 1, wherein the method is being performed by a software service instance operating on a computing node separate from the plurality of computing nodes.

10. A system comprising:
    a hardware processor of a machine; and a memory storing instructions that, when executed by the hardware processor, cause the machine to perform operations comprising:

requesting, from a software service deployment manager on a first computing node, identification of metric-providing software service instances operating on a plurality of computing nodes not including the first computing node, each particular metric-providing software service instance including a metric provider that produces pre-calculated metric data for the particular metric-providing software service instance, wherein the particular metric-providing software service instance registers with the software service deployment manager a metric-providing capability of the particular metric-providing software service instance, the pre-calculated metric data includes a metric calculated for the particular metric-providing software service instance, and the metric is calculated at a particular computing node operating the particular metric-providing software service instance;

responsive to the requesting, receiving response data from the software service deployment manager on the first computing node, wherein the response data includes identification of the metric-providing software service instances;

collecting, from one of the plurality of computing nodes, pre-calculated metric data for at least one of the metric-providing software service instances identified by the response data; and aggregating the collected pre-calculated metric data into a metric packet, wherein the aggregating is based on software service identifiers, timestamps, metric names, and user identifiers included in the pre-calculated metric data, wherein the collected pre-calculated metric data comprises a first data portion associated with a particular software service identifier and a second data portion associated with the particular software service identifier, wherein the first data portion aggregates metrics generated by first software service instances on at least two different computing nodes while servicing requests for a first user identifier, wherein the second data portion aggregates metrics generated by second software service instances on at least two different computing nodes while servicing requests for a second user identifier, wherein the first software services instances and the second software services instances are associated with the particular software service identifier, wherein the first data portion comprises at least one metric relating to a count of data sets managed by the first software service instances for servicing requests for the first user identifier, and wherein the count of data sets managed by the first software service instances is calculated by counting the first user identifier only once for the first software service instances across two or more different computing nodes.

11. The system of claim 10, wherein the response data is received over a communications network from a software service deployment manager, and the software service deployment manager monitors for metric-providing software service instances operating on a computing node.

12. The system of claim 10, wherein the aggregating is based on software service deployment identifiers, each of which identifies an exclusive group of software service identifiers.

13. The system of claim 10, wherein the response data comprises a universal resource locator (URL) for collecting pre-calculated metric data from the at least one of the metric-providing software service instances.

14. The system of claim 10, wherein the metric comprises software version information for the particular metric-providing software service instance.

15. The system of claim 10, wherein the metric comprises unique users over a time period.

16. The system of claim 10, wherein the metric comprises metrics calculated according to at least one of user identifiers, time, and date.

17. The system of claim 10, comprising storing the metric packet to a database that services software metric queries.

18. A machine-readable storage device embodying instructions that, when executed by at least one hardware processor of a machine, cause the machine to perform operations comprising:

requesting, from a software service deployment manager on a first computing node, identification of metric-providing software service instances operating on a plurality of computing nodes not including the first computing node, each particular metric-providing software service instance including a metric provider that produces pre-calculated metric data for the particular metric-providing software service instance, wherein the particular metric-providing software service instance registers with the software service deployment manager a metric-providing capability of the particular metric-providing software service instance, the pre-calculated metric data includes a metric calculated for the particular metric-providing software service instance, and the metric is calculated at a particular computing node operating the particular metric-providing software service instance;

responsive to the requesting, receiving response data from the software service deployment manager on the first computing node, wherein the response data includes identification of the metric-providing software service instances;

collecting, from one of the plurality of computing nodes, pre-calculated metric data for at least one of the metric-providing software service instances identified by the response data; and aggregating the collected pre-calculated metric data into a metric packet, wherein the aggregating is based on software service identifiers, timestamps, metric names, and user identifiers included in the pre-calculated metric data, wherein the collected pre-calculated metric data comprises a first data portion associated with a particular software service identifier and a second data portion associated with the particular software service identifier, wherein the first data portion aggregates metrics generated by first software service instances on at least two different computing nodes while servicing requests for a first user identifier, wherein the second data portion aggregates metrics generated by second software service instances on at least two different computing nodes while servicing requests for a second user identifier, wherein the first software services instances and the second software services instances are associated with the particular software service identifier, wherein the first data portion comprises at least one metric relating to a count of data sets managed by the first software service instances for servicing requests for the first user identifier, and wherein the count of data sets managed by the first software service instances is calculated by counting the first user identifier only once for the first software service instances across two or more different computing nodes.

* * * * *